(12) United States Patent
Wu et al.

(10) Patent No.: US 11,737,110 B2
(45) Date of Patent: Aug. 22, 2023

(54) METHOD AND APPARATUS FOR DETERMINING CHANNEL ACCESS SCHEME, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Zuomin Wu, Guangdong (CN); Yanan Lin, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/361,302

(22) Filed: Jun. 28, 2021

(65) Prior Publication Data
US 2021/0400705 A1    Dec. 23, 2021

Related U.S. Application Data

(63) Continuation of application No. PCT/CN2019/071480, filed on Jan. 11, 2019.

(51) Int. Cl.
*H04W 72/23*    (2023.01)
*H04L 1/1812*    (2023.01)
(Continued)

(52) U.S. Cl.
CPC .......... *H04W 72/23* (2023.01); *H04L 1/1819* (2013.01); *H04L 1/1896* (2013.01);
(Continued)

(58) Field of Classification Search
CPC ......... H04W 72/1289; H04W 72/1247; H04W 72/1273; H04W 74/0816; H04W 74/02; H04W 72/23; H04L 1/1819; H04L 1/1896
See application file for complete search history.

(56) References Cited

U.S. PATENT DOCUMENTS

| | | |
|---|---|---|
| 2013/0053035 A1 | 2/2013 | Jonsson et al. |
| 2016/0345266 A1 | 11/2016 | Park et al. |

(Continued)

FOREIGN PATENT DOCUMENTS

| | | |
|---|---|---|
| CN | 107295648 A | 10/2017 |
| CN | 107517502 A | 12/2017 |

(Continued)

OTHER PUBLICATIONS

International Search Report dated Mar. 28, 2019 of PCT/CN2019/071480 (4 pages).

(Continued)

*Primary Examiner* — Un C Cho
*Assistant Examiner* — Lalita W Pace
(74) *Attorney, Agent, or Firm* — Perkins Coie LLP

(57) ABSTRACT

Provided in the present disclosure are a method and apparatus for determining a channel access scheme, a terminal device, and a network device, the method comprising: a terminal device receiving first indication information sent by a base station, the first indication information being used by the terminal device to determine a target channel access scheme corresponding to target uplink resources, wherein the target uplink resources are used to transmit a target uplink channel and/or a target uplink signal.

18 Claims, 5 Drawing Sheets

A terminal device receives first indication information sent by a base station, wherein the first indication information is used for the terminal device to determine a target channel access scheme corresponding to a target uplink resource, and the target uplink resource is used for transmitting a target uplink channel and/or a target uplink signal

301

(51) Int. Cl.
*H04L 1/1867* (2023.01)
*H04W 72/1273* (2023.01)
*H04W 74/08* (2009.01)
*H04W 72/566* (2023.01)

(52) U.S. Cl.
CPC ..... *H04W 72/1273* (2013.01); *H04W 72/566* (2023.01); *H04W 74/0816* (2013.01)

(56) References Cited

U.S. PATENT DOCUMENTS

| | | | | |
|---|---|---|---|---|
| 2019/0150196 | A1* | 5/2019 | Koorapaty | H04W 72/0446 370/329 |
| 2019/0159253 | A1* | 5/2019 | Koorapaty | H04W 74/006 |
| 2019/0253200 | A1* | 8/2019 | Salem | H04W 74/0816 |
| 2019/0313401 | A1* | 10/2019 | Wang | H04W 72/042 |
| 2020/0170008 | A1* | 5/2020 | Sun | H04L 5/0055 |
| 2020/0229241 | A1* | 7/2020 | Jeon | H04W 74/0833 |
| 2020/0383136 | A1 | 12/2020 | Xie et al. | |
| 2020/0396765 | A1* | 12/2020 | Liang | H04W 74/004 |
| 2021/0211241 | A1* | 7/2021 | Xiong | H04L 1/1854 |
| 2022/0078841 | A1* | 3/2022 | Tiirola | H04W 72/02 |

FOREIGN PATENT DOCUMENTS

| | | |
|---|---|---|
| CN | 107926033 A | 4/2018 |
| CN | 108235439 A | 6/2018 |
| CN | 108702789 A | 10/2018 |
| CN | 109155720 A | 1/2019 |
| EP | 3021616 A2 | 5/2016 |
| KR | 20170043539 A | 4/2017 |
| KR | 20180074689 A | 7/2018 |
| KR | 20180120202 A | 11/2018 |
| KR | 20180124885 A | 11/2018 |
| KR | 20220046516 A | 4/2022 |
| WO | 2017191617 A1 | 11/2017 |
| WO | 2018047885 A1 | 3/2018 |
| WO | 2019001411 A1 | 1/2019 |

OTHER PUBLICATIONS

Extended European Search Report for European Application No. 19908927.7 dated Dec. 7, 2021. 8 pages.
Examination Report for Indian Application No. 202127033532 dated Apr. 26, 2022. 7 pages with English translation.
CAICT "Discussions on frame structure design in NR-U" R1-1809285; 3GPP TSG RAN WG1 Meeting #94; Gothenburg, Sweden; Aug. 20-24, 2018. 3 pages.
Examination Report for European Application No. 19908927.7 dated Sep. 21, 2022. 5 pages.
Examiner's Report for Canadian Application No. 3125661 dated Sep. 22, 2022. 4 pages.
First Office Action for Chinese Application No. 202110803344.6 dated Sep. 9, 2022. 11 pages with English translation.
Nokia et al. "On HARQ enhancements for NR unlicensed" R1-18010616; 3GPP TSG RAN WG1 Meeting #94bis; Chengdu, P.R. China; Oct. 8-12, 2018. 8 pages.
Notice of Reasons for Refusal for Japanese Application No. 2021-539367 dated Jul. 26, 2022. 8 pages with English translation.
NTT Docomo, Inc. "Layer 1 enhancements for NR URLLC" R1-1811378; 3GPP TSG RAN WG1 Meeting #94bis; Chengdu, China; Oct. 8-12, 2018. 19 pages.
Request for the Submission of an Opinion for Korean Application No. 10-2021-7022430 issued Jul. 19, 2022. 15 pages with English translation.
Samsung "Remaining issues of LBT signalling" R1-166690; 3GPP TSG RAN WG1 Meeting #86; Gothenburg, Sweden; Aug. 22-26, 2016. 4 pages.
Notice of Final Rejection for Korean Application No. 10-2021-7022430 dated Dec. 6, 2022. 10 pages with English translation.
Notice of Allowance with English translation dated May 26, 2023 of Korean Application No. 10-2021-7022430 (4 pages).
Notice of Preliminary Rejection with English translation dated May 17, 2023 of Korean Application No. 10-2021-7022430 (6 pages).
Second Office Action dated May 8, 2023 of Canadian Application No. 3,125,661 (3 pages).

* cited by examiner

A terminal device receives first indication information sent by a base station, wherein the first indication information is used for the terminal device to determine a target channel access scheme corresponding to a target uplink resource, and the target uplink resource is used for transmitting a target uplink channel and/or a target uplink signal ⟋ 301

FIG. 3

A base station sends first indication information to a terminal device, wherein the first indication information is used for the terminal device to determine a target channel access scheme corresponding to a target uplink resource, and the target uplink resource is used for transmitting a target uplink channel and/or a target uplink signal ⟋ 401

FIG. 4

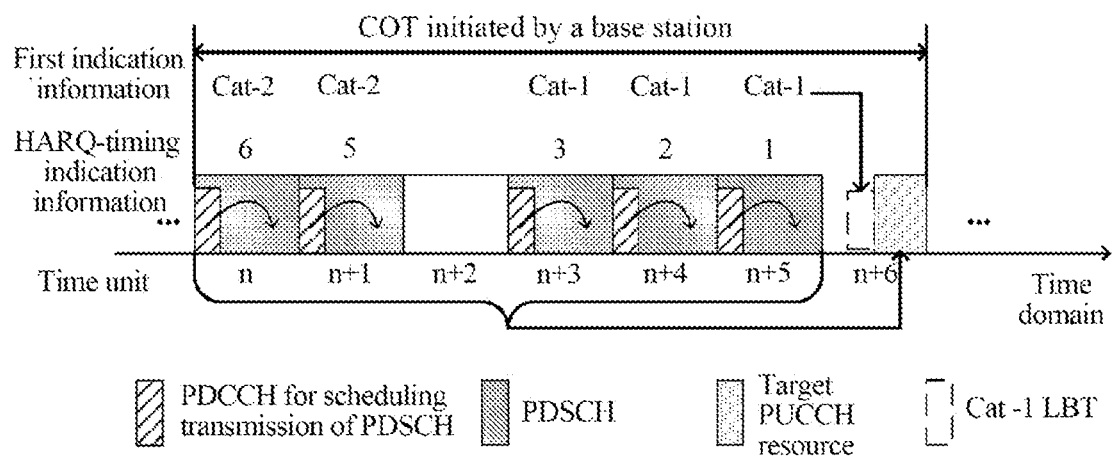

FIG. 5

METHOD AND APPARATUS FOR DETERMINING CHANNEL ACCESS SCHEME, TERMINAL DEVICE, AND NETWORK DEVICE

CROSS-REFERENCE TO RELATED APPLICATION

The present application is a continuation application of International PCT Application No. PCT/CN2019/071480, filed on Jan. 11, 2019, the entire content of which is hereby incorporated by reference.

TECHNICAL FIELD

Implementation of the present disclosure relates to the technical field of mobile communication, in particular to a method and an apparatus for determining a channel access scheme, a terminal device and a network device.

BACKGROUND

An unlicensed spectrum is a spectrum classified by countries and regions that can be used for communication of radio devices. This spectrum is generally regarded as a shared spectrum, that is, communication devices in different communication systems can use this spectrum without applying for an exclusive spectrum authority from the government, as long as the regulatory requirements set by countries or regions on this spectrum are met by the communication devices.

Regarding the unlicensed spectrum, channel access schemes applied in different transmission scenarios are specified in the prior art. The channel access schemes applied in different transmission scenarios are different, and channel access schemes applied to different signals or channels are also different. However, it is not clear which channel access scheme is to be adopted by a communication device. How does the communication device determine the channel access scheme it adopts is a problem to be solved.

SUMMARY

The implementations of the present disclosure provide a method and an apparatus for determining a channel access scheme, a terminal device and a network device.

In a first aspect, an implementation of the present disclosure provides a method for determining a channel access scheme, which includes:

receiving, by a terminal device, first indication information sent by a base station, wherein the first indication information is used for the terminal device to determine a target channel access scheme corresponding to a target uplink resource, and the target uplink resource is used for transmitting a target uplink channel and/or a target uplink signal.

In a second aspect, an implementation of the present disclosure provides a method for determining a channel access scheme, which includes:

sending, by a base station, first indication information to a terminal device, wherein the first indication information is used for the terminal device to determine a target channel access scheme corresponding to a target uplink resource, and the target uplink resource is used for transmitting a target uplink channel and/or a target uplink signal.

In a third aspect, an implementation of the present disclosure provides an apparatus for determining a channel access scheme, which includes:

a receiving unit configured to receive first indication information sent by a base station; and a determining unit configured to determine a target channel access scheme corresponding to a target uplink resource based on the first indication information, wherein the target uplink resource is used for transmitting a target uplink channel and/or a target uplink signal.

In a fourth aspect, an implementation of the present disclosure provides an apparatus for determining a channel access scheme, which includes:

a sending unit configured to send first indication information to a terminal device, wherein the first indication information is used for the terminal device to determine a target channel access scheme corresponding to a target uplink resource, and the target uplink resource is used for transmitting a target uplink channel and/or a target uplink signal.

In a fifth aspect, an implementation of the present disclosure provides a terminal device, including a processor and a memory. The memory is configured to store a computer program, and the processor is configured to call and run the computer program stored in the memory to perform the above method for determining a channel access scheme.

In a sixth aspect, an implementation of the present disclosure provides a network device, including a processor and a memory. The memory is configured to store a computer program, and the processor is configured to call and run the computer program stored in the memory to perform the above method for determining a channel access scheme.

In a seventh aspect, an implementation of the present disclosure provides a chip configured to implement the above method for determining a channel access scheme.

Specifically, the chip includes a processor, configured to call and run a computer program from a memory, so that a device in which the chip is installed performs the above method for determining a channel access scheme.

In an eighth aspect, an implementation of the present disclosure provides a computer readable storage medium configured to store a computer program which enables a computer to perform the above method for determining a channel access scheme.

In an ninth aspect, an implementation of the present disclosure provides a computer program product including computer program instructions, wherein the computer program instructions enable a computer to perform the above method for determining a channel access scheme.

In a tenth aspect, an implementation of the present disclosure provides a computer program, which, when running on a computer, enables a computer to perform the above method for determining a channel access scheme.

According to the above technical solution, the base station sends to the terminal device the first indication information for determining the target channel access scheme, so that the terminal device performs signal detection on the unlicensed spectrum according to the target channel access scheme indicated by the first indication information, thereby ensuring fairness of use of the unlicensed spectrum.

BRIEF DESCRIPTION OF DRAWINGS

Drawings described herein are used to provide a further understanding of the present disclosure and form a part of the present disclosure. Illustrative examples of the present disclosure and the description thereof are used to explain the present disclosure and do not constitute improper limitation on the present disclosure.

FIG. 3 is a first schematic flowchart of a method for determining a channel access scheme according to an implementation of the present disclosure.

FIG. 4 is a second schematic flowchart of a method for determining a channel access scheme according to an implementation of the present disclosure.

FIG. 5 is a schematic diagram of an application example 1 according to an implementation of the present disclosure.

DETAILED DESCRIPTION

Technical solutions in implementations of the present disclosure will be described below with reference to the drawings in implementations of the present disclosure. Apparently, the implementations described are just a part of implementations of the present disclosure, but not all implementations of the present disclosure. Based on the implementations in the present disclosure, all other implementations obtained by those of ordinary skill in the art without paying an inventive effort shall fall within the protection scope of the present disclosure.

The technical solutions of the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), an Advanced long term evolution (LTE-A) system, a New Radio (NR) system, an evolution system of NR system, an LTE-based access to unlicensed spectrum (LTE-U) system, an NR-based access to unlicensed spectrum (NR-U) system, a Universal Mobile Telecommunication System (UMTS), a Worldwide Interoperability for Microwave Access (WiMAX) communication system, Wireless Local Area Networks (WLAN), Wireless Fidelity (WiFi), a next generation communication system or other communication systems.

Generally speaking, a conventional communication system supports a limited number of connections and is easy to implement. However, with a development of communication technology, a mobile communication system will not only support traditional communication, but also support, for example, Device to Device (D2D) communication, Machine to Machine (M2M) communication, Machine Type Communication (MTC), and Vehicle to Vehicle (V2V) communication. The implementations of the present disclosure may also be applied to these communication systems.

Figure 1:
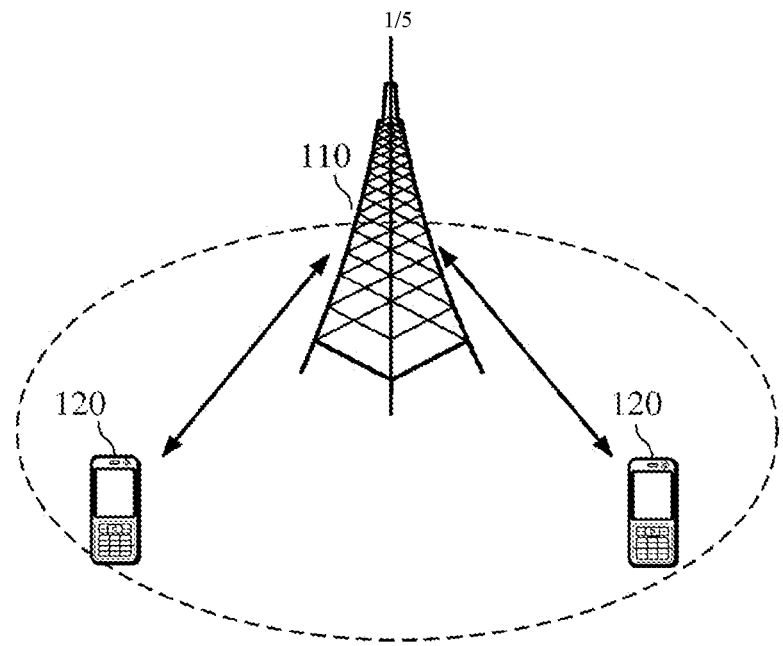
FIG. 1 is a schematic diagram of an architecture of a communication system according to an implementation of the present disclosure.

Illustratively, a communication system 100 applied in an implementation of the present disclosure is shown in FIG. 1. The communication system 100 may include a network device 110, and the network device 110 may be a device that communicates with a terminal device 120 (or referred to as a communication terminal, or a terminal). The network device 110 may provide communication coverage for a specific geographical area, and may communicate with a terminal device located within the coverage area. Optionally, the network device 110 may be a Base Transceiver Station (BTS) in a GSM system or CDMA system, a NodeB (NB) in a WCDMA system, an Evolutional Node B (eNB or eNodeB) in an LTE system, or a radio controller in a Cloud Radio Access Network (CRAN), or the network device may be a network side device in a mobile switch center, a relay station, an access point, a vehicle-mounted device, a wearable device, a hub, a switch, a bridge, a router, or a network side device in a 5G network, or a network device in a future evolved Public Land Mobile Network (PLMN), etc.

The communication system 100 also includes at least one terminal device 120 located within the coverage area of the network device 110. As used herein, the term "terminal device" includes, but is not limited to, a device configured to connect via a wired circuit, for example, via Public Switched Telephone Networks (PSTN), a Digital Subscriber Line (DSL), a digital cable, or a direct cable; and/or another data connection/network; and/or via a wireless interface, for example, for a cellular network, a Wireless Local Area Network (WLAN), a digital television network such as a DVB-H network, a satellite network, or an AM-FM broadcast sender; and/or an apparatus, of another terminal device, configured to receive/send a communication signal; and/or an Internet of Things (IoT) device. A terminal device configured to communicate via a wireless interface may be referred to as a "wireless communication terminal", a "wireless terminal" or a "mobile terminal". Examples of the mobile terminal include, but not limited to, a satellite or cellular telephone, a Personal Communication System (PCS) terminal which may combine with a cellular radio telephone and data processing, faxing, and data communication abilities, a PDA that may include a radio telephone, a pager, an Internet/intranet access, a Web browser, a memo pad, a calendar, and/or a Global Positioning System (GPS) receiver, and a conventional laptop and/or palmtop receiver or another electronic apparatus including a radio telephone transceiver. The terminal device may be referred to as an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) telephone, a Wireless Local Loop (WLL) station, a Personal Digital Assistant (PDA), a handheld device with a wireless communication function, a computing device, or another processing device connected to a wireless modem, a vehicle-mounted device, a wearable device, a terminal device in a 5G network, or a terminal device in a future evolved PLMN, or the like.

Optionally, Device to Device (D2D) communication may be performed between the terminal devices 120.

Optionally, the 5G system or the 5G network may also be referred to as a New Radio (NR) system or an NR network.

FIG. 1 shows one network device and two terminal devices as an example. Optionally, the communication system 100 may include multiple network devices, and another quantity of terminal devices may be included within a coverage area of each network device, and this is not limited in the implementations of the present disclosure.

Optionally, the communication system 100 may also include another network entity such as a network controller, a mobile management entity, or the like, which is not limited in the implementations of the present disclosure.

It should be understood that, a device with a communication function in a network/system in the implementations of the present disclosure may be referred to as a communication device.

Taking the communication system 100 shown in FIG. 1 as an example, the communication device may include a network device 110 and a terminal device 120 which have communication functions, and the network device 110 and the terminal device 120 may be the specific devices described above, which will not be repeated here again. The communication device may also include another device in the communication system 100, for example, another network entity such as a network controller, a mobile management entity, which is not limited in the implementations of the present disclosure.

It should be understood that the terms "system" and "network" herein are often used interchangeably in this document. The term "and/or" in this document is merely an association relationship describing associated objects, indicating that there may be three relationships, for example, A and/or B may indicate three cases: A alone, both of A and B, and B alone. In addition, the symbol "/" in this document generally indicates that objects before and after the symbol "/" have an "or" relationship.

In order to facilitate understanding of technical solutions of the implementations of the present disclosure, the related art of the implementations of the present disclosure are described below, and any combination of the following related art and the technical solutions of the implementations of the present disclosure should be subject to the protection scope of the implementations of the present disclosure.

In order to enable various communication systems using unlicensed spectrum for wireless communication to coexist amicably on this spectrum, some countries or regions have stipulated the legal requirements that must be met for using unlicensed spectrum. For example, the communication devices follow the "Listen Before Talk (LBT)" principle, that is, before transmitting signals on a channel of the unlicensed spectrum, the communication devices need to conduct channel sensing first, and the communication devices can transmit signals only when the result of channel sensing is that the channel is idle. If the result of channel sensing by the communication devices on an unlicensed spectrum channel is that the channel is busy, the communication devices cannot transmit signals. In order to ensure fairness, in one transmission, a duration of signal transmission by a communication device using the channel on the unlicensed spectrum may not exceed a Maximum Channel Occupancy Time (MCOT).

Optionally, in an implementation of the present disclosure, the communication device may have the following four types of channel access schemes when performing the LBT, wherein a bandwidth for the LBT may be 20 MHz, or an integer multiple of 20 MHz.

Category 1 (Cat-1 LBT): transmitting immediately after the switching gap is ended only applicable within a Channel Occupancy Time (COT).
the switching gap from receiving to sending shall not exceed 16 µs.

Category 2 (Cat-2 LBT): single slot detection, also referred to as LBT without a random backoff
if the channel is idle within a single detection time, the signal can be sent, and if the channel is occupied, the signal cannot be sent.

Category 3 (Cat-3 LBT): LBT with a random backoff based on a fixed Contention Window Size (CWS)
the communication device determines the CWS as $CW_p$.
the $CW_p$ is a fixed value.
the communication device generates a random number N according to a value of $CW_p$.
the communication device performs channel sensing on an unlicensed spectrum, and can send a signal after the channel sensing is successful in each of N slots.

Category 4 (Cat-4 LBT): LBT based on random backoff of variable CWS the communication device determines the CWS as $CW_p$.
the $CW_p$ is variable.
the communication device generates a random number N according to a value of $CW_p$.
the communication device performs channel sensing on an unlicensed spectrum, and can send a signal after the channel sensing is successful in each of N slots.

Optionally, Cat-3 LBT and Cat-4 LBT further distinguish priorities of channel access schemes according to priorities of transmission services.

Optionally, in an implementation of the present disclosure, the MCOT refers to a maximum time length allowed for signal transmission using a channel of an unlicensed spectrum after LBT is successful, and there are different MCOTs under different channel access priorities. Optionally, the MCOT is time occupied by signal transmission.

Optionally, in an implementation of the present disclosure, the COT refers to a time length of signal transmission using a channel of an unlicensed spectrum after LBT is successful, and occupancy of a channel by the signal during this time length may be discontinuous. Optionally, the maximum length of one COT cannot exceed 20 ms, and the time length occupied by signal transmission within the COT does not exceed the MCOT.

Optionally, in an implementation of the present disclosure, a channel occupancy time of the base station (a gNB-initiated COT) is called as a COT initiated by the base station, which refers to one channel occupancy time obtained after a base station LBT succeeds. In addition to downlink transmission, the channel occupancy time of the base station may also be used for uplink transmission by UE under a certain condition.

Optionally, in an implementation of the present disclosure, a channel occupancy time of the UE (a UE-initiated COT) is also called a COT initiated by the UE, which refers to one channel occupancy time obtained after a UE LBT succeeds.

Optionally, in an implementation of the present disclosure, a DL transmission opportunity (i.e., DL burst) refers to a group of downlink transmissions (i.e., including one or more downlink transmissions) performed by the base station, wherein the group of downlink transmissions are continuous transmissions (i.e., there are no gaps between the multiple downlink transmissions), or the group of downlink transmissions have gaps therebetween but the gaps are less than or equal to 16 μs. If a gap between two downlink transmissions performed by the base station is greater than 16 μs, it is considered that the two downlink transmissions belong to two DL bursts. Optionally, one downlink transmission refers to one PDSCH.

Optionally, in an implementation of the present disclosure, a UL transmission opportunity (i.e., UL burst) refers to a group of uplink transmissions (i.e., including one or more uplink transmissions) performed by the UE, wherein the group of uplink transmissions are continuous transmissions (i.e., there are no gaps between the multiple uplink transmissions), or the group of uplink transmissions have gaps therebetween but the gaps are less than or equal to 16 μs. If a gap between two uplink transmissions performed by the base station is greater than 16 μs, it is considered that the two uplink transmissions belong to two UL bursts. Optionally, one uplink transmission refers to one PUSCH.

Optionally, in an implementation of the present disclosure, channel access schemes applied in different transmission scenarios are different, and the channel access schemes applied to different signals or channels are also different.

For example, when the base station initiates a COT, channel access schemes under different conditions are specified in table 1.

TABLE 1

| Target signal | Cat-2 LBT | Cat-4 LBT |
| --- | --- | --- |
| Only DRS or the DRS is multiplexed with non-unicast data (such as OSI, paging, RAR, etc.) | If a duty ratio of the DRS is ≤1/20 and the total length is ≤1 ms, use a single LBT of 25 us | If the duty ratio of the DRS is >1/20 or the total length is >1 ms, Determine a channel access priority according to a service priority |
| The DRS is multiplexed with unicast data | Usually not supported | Determine a channel access priority according to a service priority |
| PDCCH and PDSCH | Usually not supported | Determine a channel access priority according to a service priority |

Channel Access Scheme of Base Station

It should be understood that when a service includes data multiplexing transmission of multiple priorities, the channel access priority is determined according to the data of the lowest priority among the multiple priorities.

Figure 2:
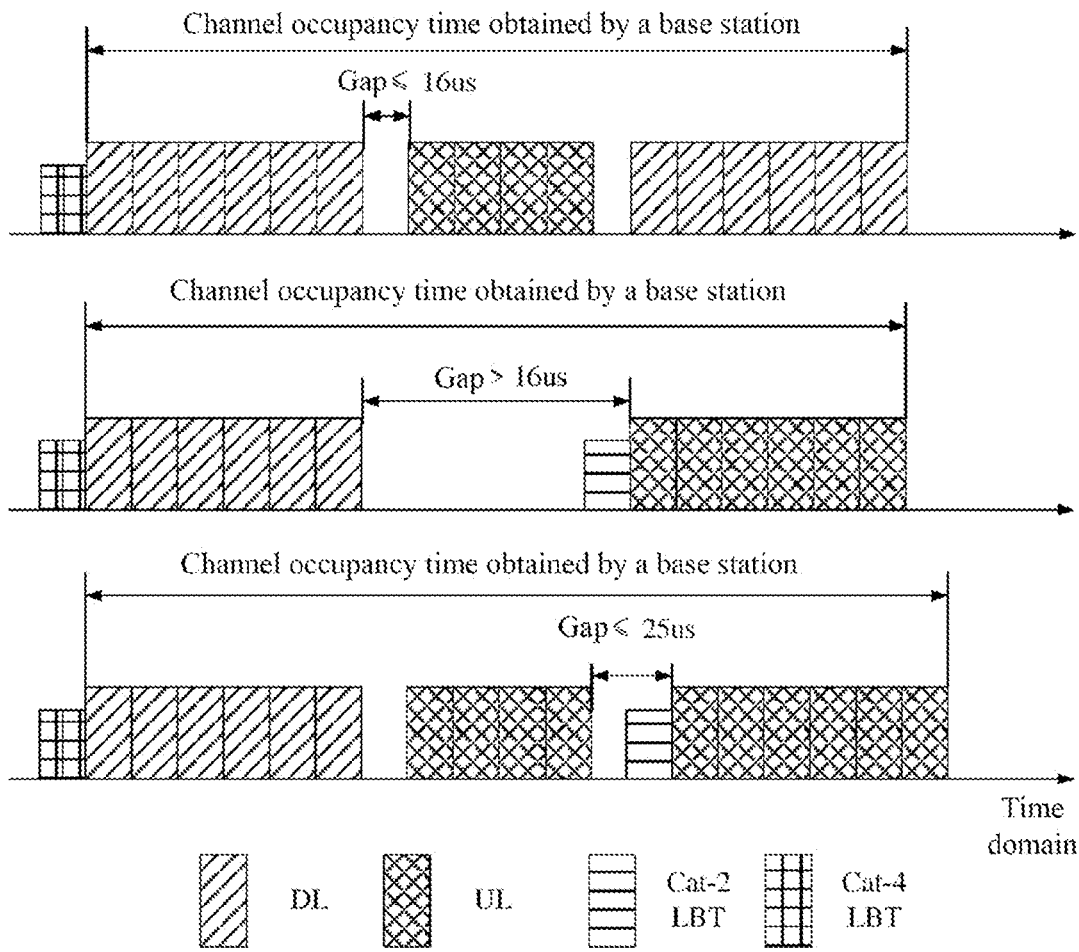
FIG. 2 is a schematic diagram of uplink transmission by a UE after a COT is initiated by a base station according to an implementation of the present disclosure.

For another example, referring to FIG. 2, after the base station initiates a COT, a resource in the COT may be used for uplink transmission by the UE. A UL burst appears in the COT of the base station, and if a gap between a starting position of the UL burst and an end position of the UL burst is less than or equal to 16 μs, the UE can immediately perform the uplink transmission. If there is no DL burst behind the UL burst in the COT of the base station, the UE can perform a Cat-2 LBT before transmission. If a gap between any two adjacent transmissions in the COT of the base station is less than or equal to 25 μs, the UE can perform a Cat-2 LBT.

For another example, when the UE initiates a COT, channel access schemes under different conditions are specified in table 2.

TABLE 2

| | Cat-2 LBT | Cat-4 LBT |
| --- | --- | --- |
| PUSCH (at least including user plane data) | Not supported, unless the PUSCH only includes uplink control information, such as HARQ-ACK, SR, and CSI | Determine a channel access priority according to a service priority |
| Only SRS | Not supported | Highest channel access priority |
| Only RACH (Random Access Channel) | Undetermined | Highest channel access priority |
| Only PUCCH | Undetermined | Highest channel access priority |

Channel Access Scheme of UE

In the above technology, the channel access schemes applied in different transmission scenarios are specified, but for the UE, before performing an uplink signal/channel transmission, the UE cannot explicitly know which scenario a target uplink resource is in, such as whether it is in a COT of a base station, etc. It can be known from the above technology that the channel access schemes of the target uplink resource in the COT of the base station and outside the COT of the base station are different, and when the target uplink resource is in the COT of the base station, the sizes of gaps are different and the channel access schemes are also different, therefore the UE cannot effectively determine a corresponding channel access scheme.

FIG. 3 is a first schematic flowchart of a method for determining a channel access scheme according to an implementation of the present disclosure, and this example is applied to a terminal device side. As shown in FIG. 3, the method for determining a channel access scheme includes the following act 301.

In act 301, a terminal device receives first indication information sent by a base station, wherein the first indication information is used for the terminal device to determine a target channel access scheme corresponding to a target uplink resource, and the target uplink resource is used for transmitting a target uplink channel and/or a target uplink signal.

In an implementation of the present disclosure, the terminal device may be any device capable of communicating with a network, such as a mobile phone, a vehicle-mounted terminal, a wearable device, a laptop, a tablet computer.

In an implementation of the present disclosure, the base station may be a network device, such as a 4G base station, a 5G base station, an enhanced 5G base station.

In an implementation of the present disclosure, the target uplink resource is a resource on an unlicensed carrier.

Optionally, in an implementation of the present disclosure, the target uplink channel and/or the target uplink signal includes at least one of the following: an uplink control channel, an uplink data channel, a random access channel, a Sounding Reference Signal (SRS), a DeModulation Reference Signal (DMRS), a Scheduling Request (SR), Channel State Information (CSI), and Hybrid Automatic Repeat-reQuest Acknowledgement (HARQ-ACK) information. Optionally, the CSI includes at least one of Rank Indication (RI), Precoding Matrix Indicator (PMI) and Channel Quality Indicator (CQI).

It should be noted that the uplink control channel in the implementation of the present disclosure at least includes a Physical Uplink Control Channel (PUCCH), the uplink data channel at least includes a Physical Uplink Shared Channel (PUSCH), and the random access channel at least includes a physical random access channel (PRACH). In addition, the SR, CSI and HARQ-ACK may be transmitted through an uplink control channel (such as a PUCCH) or an uplink data channel (such as a PUSCH).

Optionally, the PUSCH includes at least one of a scheduled PUSCH, a Configured Grant PUSCH (CG-PUSCH), and a PUSCH only used for transmitting Uplink Control Information (UCI).

In an implementation of the application, the terminal device may receive the first indication information sent by the base station by either one of the following two methods.

Method 1: the terminal device receives the first indication information sent by the base station through a terminal device-specific Radio Network Temporary Identifier (RNTI).

Optionally, the terminal device receives a first downlink control channel sent by the base station, wherein the first downlink control channel includes the first indication information, and the first downlink control channel is scrambled by the terminal device-specific RNTI. Or, here, the first indication information is sent to the UE through a UE-specific DCI (Downlink Control Information).

Optionally, when the target uplink signal and/or the target uplink channel is different, the DCI carrying the first indication information may be different.

Method 2: the terminal device receives the first indication information sent by the base station through a cell-common RNTI, a group-common RNTI, or channel occupancy time (COT)-common scrambling code information.

Optionally, the terminal device receives a first downlink control channel sent by the base station, wherein the first downlink control channel includes the first indication information, and the first downlink control channel is scrambled by the common RNTI. Or, here, the first indication information is sent to the UE through a common DCI.

Optionally, the first indication information is sent to the UE through a cell-common DCI or a group-common DCI.

Optionally, the first indication information in each COT is the same, or the terminal device receives the first indication information through the COT-common scrambling code information.

Optionally, different UEs may determine target channel access schemes corresponding to target uplink resources according to the same first indication information.

In method 2, the first indication information is transmitted through the common signaling, so that multiple UEs can determine their respective target channel access schemes after receiving the common signaling, thus no new information bit needs to be added into the UE-specific DCI, and signaling overhead of the UE-specific DCI is saved.

Optionally, the first indication information may also be sent to the UE through Slot format indicator (SFI) information.

In an implementation of the present disclosure, the terminal device receives a first downlink control channel sent by a base station, and the first downlink control channel includes the first indication information. For example, the terminal device receives PDCCH1 sent by the base station, and PDCCH1 includes the first indication information.

Optionally, PDCCH1 is scrambled by at least one of the following RNTIs: Cell RNTI (C-RNTI), Configured Scheduling RNTI (CS-RNTI), Modulation and Coding Scheme C-RNTI (MCS-C-RNTI), Semi-Persistent CSI-RNTI (SP-CSI-RNTI), Temporary C-RNTI (TC-RNTI), Paging RNTI (P-RNTI), System Information RNTI (SI-RNTI), Random Access RNTI (RA-RNTI), Common Control RNTI (CC-RNTI), Group RNTI (G-RNTI), Slot Format Indication RNTI (SFI-RNTI), Interruption RNTI (INT-RNTI), Transmit Power Control-PUSCH-RNTI (TPC-PUSCH-RNTI), Transmit Power Control-PUCCH-RNTI (TPC-PUCCH-RNTI), Transmit Power Control-Sounding Reference Symbols-RNTI (TPC-SRS-RNTI), and Sidelink RNTI (SL-RNTI).

Hereinafter, description will be made with reference to different implementation modes of the target uplink channel, respectively.

Optionally, the target uplink channel includes a first uplink control channel, wherein the first downlink control channel includes information for determining the target uplink resource of the first uplink control channel.

For example, when the target uplink channel is a PUCCH, PDCCH1 for determining the PUCCH resource includes the first indication information.

Here, because the target uplink resource may be dynamically indicated through the first downlink control channel, a same first downlink control channel is used for indicating the target channel access schemes corresponding to the target uplink resources at the same time, such that the number of times of blind detections of downlink control channel by the terminal device can be reduced, and that the terminal device needs to receive multiple downlink control channels to determine the transmission of the target uplink signal and/or the target uplink channel can also be avoided.

Optionally, the first downlink control channel further includes information for scheduling transmission of first downlink data channel, and the first uplink control channel is used for transmitting HARQ-ACK information corresponding to the first downlink data channel.

For example, if the target uplink resource is a PUCCH resource for transmitting HARQ-ACK information corresponding to the PDSCH, and the target uplink resource is indicated by a downlink grant (i.e., PDCCH1) for scheduling the PDSCH, the downlink grant further includes the first indication information, wherein the first indication information is used for determining a target channel access scheme.

Optionally, if multiple first downlink control channels include indication information of target uplink resources of at least one first uplink control channel which have a same time domain position, and at least two first downlink control channels among the multiple first downlink control channels include the first indication information, then the terminal device determines a target channel access scheme corresponding to the target uplink resources according to at least one of the at least two pieces of first indication information.

For example, if multiple downlink grants include PUCCH resources which have a same time domain position (for example, multiple PDCCH1s schedule transmission of multiple PDSCHs, and each PDCCH1 among the multiple PDCCH1s includes indication information of a PUCCH resource, and the multiple PUCCH resources have the same time domain position), and at least two downlink grants among the multiple downlink grants respectively include the first indication information, then the UE determines the target channel access scheme according to at least one of the at least two pieces of first indication information. When multiple pieces of first indication indicate the target channel access scheme corresponding to the same target uplink resource, it is needed to specify which one of the multiple pieces of first indication information shall prevail.

Optionally, the terminal device determines the target channel access scheme corresponding to the target uplink resource according to the last first indication information of the at least two pieces of first indication information. Or, the terminal device determines the target channel access scheme corresponding to the target uplink resource according to the penultimate first indication information of the at least two pieces of first indication information.

For example, the UE determines the target channel access scheme according to the last first indication information of the at least two pieces of first indication information. Since the latter the first indication information is, the more accurately the scheduling plan of the base station can be expressed, the last first indication information of the multiple pieces of first indication information may prevail.

For another example, the UE determines the target channel access scheme according to the penultimate first indication information of the at least two pieces of first indication information. In view of that there is a processing delay when the UE receives the first indication information, the penultimate first indication information of the multiple pieces of first indication information may prevail, so as to reserve sufficient processing time for the UE.

Optionally, the first uplink control channel is used for transmitting HARQ-ACK information corresponding to a second downlink data channel, wherein the second downlink data channel is scheduled through a second downlink control channel.

Here, if the target uplink resource is a PUCCH resource used for transmitting HARQ-ACK information corresponding to a PDSCH, a downlink grant for scheduling the PDSCH is PDCCH2, and a PUCCH resource for transmitting the HARQ-ACK information may be indicated by a trigger signaling (i.e., PDCCH1), then the trigger signaling includes first indication information, wherein the first indication information is used for determining the target channel access scheme.

Optionally, the target uplink channel and/or the target uplink signal includes at least one of SR and SRS, and the first downlink control channel includes information for requesting sending of the SR and/or the SRS.

Optionally, the first downlink control channel includes information for scheduling transmission of the first downlink data channel, or the first downlink control channel includes information for scheduling transmission of the first uplink data channel.

For example, when an uplink grant (i.e., PDCCH1) for scheduling transmission of the PUSCH includes information for requesting sending of the SR and/or the SRS, the uplink grant includes first indication information, wherein the first indication information is used for determining a target channel access scheme corresponding to the SRS and/or CSI.

In another example, when a downlink grant (i.e., PDCCH1) for scheduling transmission of the PDSCH includes information for requesting sending of the SRS, the downlink grant includes first indication information, wherein the first indication information is used for determining a target channel access scheme corresponding to the SRS.

In another example, when a downlink grant (i.e., PDCCH1) for scheduling transmission of the PDSCH includes information for requesting sending of the SR, the downlink grant includes first indication information, wherein the first indication information is used for determining a target channel access scheme corresponding to the SR.

Optionally, the target uplink channel includes CSI, and the first downlink control channel includes information for requesting sending of the CSI.

Optionally, the target uplink channel includes a first uplink data channel, wherein the first uplink data channel includes CSI, and the first downlink control channel includes information for scheduling transmission of the first uplink data channel.

For example, the CSI is transmitted through a PUSCH, and an uplink grant (i.e., PDCCH1) for scheduling transmission of the PUSCH includes information for requesting sending of the CSI, wherein the uplink grant includes first indication information, and the first indication information is used for determining a target channel access scheme corresponding to the CSI.

Optionally, the target uplink channel includes a second uplink control channel, wherein the second uplink control channel includes CSI, and the first downlink control channel includes information for determining a target uplink resource of the second uplink control channel Optionally, the CSI is transmitted through a PUCCH, and PDCCH1 for scheduling transmission of the PUCCH includes information for requesting sending of the CSI, the PDCCH1 includes first indication information which is used for determining a target channel access scheme corresponding to the CSI.

Optionally, the CSI is transmitted through a PUSCH, and an downlink grant (i.e., PDCCH1) for scheduling transmission of the PUSCH includes information for requesting sending of the CSI, wherein the downlink grant includes first indication information, and the first indication information is used for determining the target channel access scheme corresponding to the CSI. Optionally, the downlink grant further includes indication information for determining a target PUCCH resource for transmitting the CSI. When a PUCCH on an unlicensed carrier occupies a relatively large quantity of frequency domain resources, the CSI information triggered to be sent by the base station may be transmitted through a PUCCH resource, and accordingly, the trigger signaling may be carried through a downlink grant for scheduling, by the base station, the UE to perform the PDSCH reception.

Optionally, if the target uplink resource is a resource for transmitting aperiodic SR, SRS or CSI, and the target uplink resource is indicated by trigger signaling DCI, the trigger signaling DCI further includes indication information, and the indication information is used for determining the target channel access scheme.

Optionally, when the target uplink channel is a PUSCH, an uplink grant for scheduling transmission of the PUSCH includes the first indication information.

In an implementation of the present disclosure, the first indication information includes at least one of the following information:

whether the target uplink resource is in a COT initiated by the base station;

the target channel access scheme;

a priority of the target channel access scheme;

an end position of a previous transmission opportunity of the transmission opportunity where the target uplink resource is located;

a gap size between a starting position of the transmission opportunity where the target uplink resource is located and the end position of the previous transmission opportunity;

whether transmission of the target uplink signal and/or the target uplink channel includes a placeholder signal;

a starting position of the transmission of the target uplink signal and/or the target uplink channel; and a starting position of the target uplink resource.

How the UE determines the target channel access scheme and how to perform uplink transmission when the first indication information includes the above information is described in the following.

1) Optionally, the first indication information is used for determining whether the target uplink resource is in a COT initiated by the base station. For example, the first indication information includes 1 bit, wherein the 1 bit is used for determining whether the target uplink resource is in the COT initiated by the base station or is not in the COT initiated by the base station. When the target uplink resource is not in the COT initiated by the base station, the UE determines the target channel access scheme according to Table 2.

2) Optionally, the first indication information is used for determining the target channel access scheme. For example, the first indication information includes 1 bit, wherein the 1 bit is used for indicating that the target channel access scheme is Cat-1 LBT or Cat-2 LBT. This is mainly because when the target uplink resource is in the COT of the base station, there are only two candidate target channel access schemes, therefore they can be distinguished by one bit. For example, the UE can determine whether the target uplink resource is in the COT of the base station according to other information, and determine the specific target channel access scheme according to the 1 bit. For another example, the first indication information includes 1 bit, the 1 bit is used for indicating whether the target channel access scheme is Cat-4 LBT or not. For another example, the first indication information includes 2 bits, the 2 bits are used for indicating that the target channel access scheme is at least one of Cat-1 LBT, Cat-2 LBT, Cat-3 LBT and Cat-4 LBT.

3) Optionally, the first indication information is used for determining a priority of the target channel access scheme. When the target channel access scheme is Cat-4 LBT, because Cat-4 LBT further distinguishes the priority of the channel access scheme according to a priority of transmission service, the first indication information may indicate the priority of the channel access scheme under Cat-4, for example, indicating the value of p in Table 3. Table 3 is an example of channel access parameters corresponding to different channel priorities under Cat-4, and the smaller the value of P, the higher the priority.

TABLE 3

| Channel access priority (p) | $m_p$ | $CW_{min,p}$ | $CW_{max,p}$ | $T_{mcot,p}$ | Allowed value of $CW_p$ |
| --- | --- | --- | --- | --- | --- |
| 1 | 2 | 3 | 7 | 2 ms | {3, 7} |
| 2 | 2 | 7 | 15 | 4 ms | {7, 15} |
| 3 | 3 | 15 | 1023 | 6 or 10 ms | {15, 31, 63, 127, 255, 511, 1023} |
| 4 | 7 | 15 | 1023 | 6 or 10 ms | {15, 31, 63, 127, 255, 511, 1023} |

4) Optionally, the first indication information is used for determining an end position of the previous transmission opportunity of the transmission opportunity where the target uplink resource is located. The UE determines the target channel access scheme according to the end position and the starting position of the target uplink resource. For example, when the gap between the end position and the starting position is less than or equal to 16 μs, the UE may immediately perform transmission on the target uplink resource without channel sensing. For another example, in the COT of the base station, when the gap between the end position and the starting position is greater than 16 μs, the UE may perform transmission on the target uplink resource after a Cat-2 LBT succeeds.

5) Optionally, the first indication information is used for determining a gap size between a starting position of the transmission opportunity where the target uplink resource is located and an end position of the previous transmission opportunity, and determining a range of the gap size. The UE determines the target channel access scheme according to the range of the gap size. For example, when the gap size is less than or equal to 16 μs, the corresponding target channel access scheme is Cat-1. For example, when the gap size is greater than 16 μs and less than or equal to 25 s, the corresponding target channel access scheme is Cat-2. For example, when the gap size is greater than 25 μs, the corresponding target channel access scheme is Cat-4.

6) Optionally, the first indication information is used for determining whether the transmission of the target uplink signal and/or the target uplink channel includes a placeholder signal. In other words, the first indication information is used for determining whether the transmission of the target uplink signal and/or the target uplink channel needs to include transmission of a placeholder signal, so as to satisfy a condition that a gap between two adjacent transmissions is less than or equal to a preset value such as 16 16 μs. This is mainly because that in the COT initiated by the base station, when the gap between two adjacent transmissions is less than or equal to 16 μs, the UE may transmit a signal on the uplink resource without channel sensing (or Cat-1 LBT). In order to satisfy the condition that the gap between two adjacent transmissions is less than or equal to 16 μs, the base station may instruct the UE to transmit a placeholder signal.

7) Optionally, the first indication information is used for determining a first starting position of the transmission of the target uplink signal and/or the target uplink channel, and/or the first indication information is used for determining a second starting position of the target uplink resource. Optionally, when the first starting position and the second starting position are different, if the second starting position is later than the first starting position, the target uplink signal and/or the target uplink channel which should be mapped to a position between the first starting position and the second starting position should be punctured. Optionally, when the first starting position and the second starting position are different, if the first starting position is later than the second starting position, the placeholder signal is transmitted between the first starting position and the second starting position.

Further, optionally, a length of the placeholder signal is preset or indicated by the base station. Optionally, a content of the placeholder signal is preset or indicated by the base station. For example, the placeholder signal may be an extension part of cyclic prefix of the first symbol transmitted on the target uplink resource. For another example, the placeholder signal may be a pilot sequence, and optionally, the pilot sequence is mapped with equal intervals in the frequency domain. Optionally, the placeholder signal may be SR, SRS, DMRS, etc.

Optionally, the terminal device determines the target channel access scheme corresponding to the target uplink resource based on a first rule. If the terminal device receives the first indication information sent by the base station before executing the target channel access scheme, the terminal device re-determines the target channel access scheme corresponding to the target uplink resource according to the first indication information.

For example, the UE may re-determine the target channel access scheme of the target uplink resource according to the first indication information. For example, the UE initially determines that the channel access scheme corresponding to the target uplink resource for transmitting PUCCH is Cat-4 LBT with the highest channel access priority according to Table 2. After receiving the first indication information, when the UE determines that the target uplink resource is in the COT initiated by the base station and a gap between a starting position of the target uplink resource and an end position of a previous transmission opportunity is less than or equal to 16 s, the UE can determine that the channel access scheme corresponding to the target uplink resource is Cat-1 LBT.

It should be understood that the base station needs to determine the target channel access scheme corresponding to the target uplink resource according to a position of the target uplink resource, such as whether the target uplink resource is in the COT of the base station, and indicate the target channel access scheme to the UE. However, the starting position of the COT of the base station depends on a channel sensing result, that is, the position of the COT is dynamic, therefore, a case that the target uplink resource is partially located in the COT of the base station and partially located outside the COT of the base station may appear.

Optionally, in an implementation of the present disclosure, when the target uplink resource is partially located outside the COT of the base station, the target uplink resource may be considered as being not in the COT of the base station.

Optionally, in an implementation of the present disclosure, when the target uplink resource is partially located inside the COT of the base station, the target uplink resource may be considered as being in the COT of the base station.

Optionally, in an implementation of the present disclosure, whether the target uplink resource is in the COT of the base station is determined according to a priority of a signal or channel to be transmitted on the target uplink resource. For example, the signal or channel to be transmitted has a high priority, it may be considered as being in the COT of the base station. The signal or channel to be transmitted has a low priority, it may be considered as being not in the COT of the base station.

Optionally, signals or channels with high priority include PUCCH, PUSCH including UCI only, SR, SRS, PRACH, PUSCH including HARQ-ACK information, etc. Optionally, a signal or channel with a low priority includes a periodic signal such as periodic SR, CSI, SRS, a scheduled PUSCH, CG-PUSCH, etc.

Optionally, in an implementation of the present disclosure, whether the target uplink resource is in the COT of the base station is determined according to a proportion of time domain resource of the target uplink resource in the COT of the base station. For example, when a ratio of a time domain resource portion of the target uplink resource located inside the COT of the base station to a time domain resource portion of the target uplink resource located outside the COT of the base station is greater than or equal to a preset threshold such as 1, the target uplink resource may be considered as being in the COT of the base station. When the ratio the time domain resource portion of the target uplink resource located inside the COT of the base station to the time domain resource portion of the target uplink resource located outside the COT of the base station is less than 1, the target uplink resource may be considered as being not in the COT of the base station.

Optionally, in an implementation of the present disclosure, whether the target uplink resource is in the COT of the base station is determined jointly according to the priority of the signal or channel to be transmitted on the target uplink resource and the proportion of time domain resource of the target uplink resource in the COT of the base station. For example, for a signal or channel with a high priority, a threshold with a smaller value is preset. For a signal or channel with a low priority, a threshold with a larger value is preset.

Optionally, in an implementation of the present disclosure, when the target uplink resource includes multiple time-domain units (e.g., multiple slots) in the time domain, the first indication information includes indication information of a channel access scheme of at least one time-domain unit of the multiple time-domain units. Or, the first indication information includes indication information of a channel access scheme of the first time domain unit of the multiple time domain units. Or, the first indication information includes indication information of a channel access scheme of each time domain unit of the multiple time domain units.

Optionally, in an implementation of the present disclosure, when the target uplink resource includes multiple frequency-domain units in the frequency domain (for example, a unit for the frequency-domain units is a sub-band, wherein a size of the sub-band is the same as a bandwidth when the UE performs channel sensing, such as 20 MHz or an integer multiple of 20 MHz), the first indication information includes the indication information of a channel access scheme of at least one frequency-domain units of the multiple frequency-domain units. Or, the first indication information includes indication information of a channel access scheme of the first frequency-domain unit of the multiple frequency-domain units. Or, the first indication information includes indication information of a channel access scheme of each frequency-domain unit of the multiple frequency-domain units. Or, the indication information of the channel access scheme included in the first indication information is used for determining the channel access schemes of the multiple frequency-domain units, wherein the channel access scheme of each frequency-domain unit of the multiple frequency-domain units is all the same.

An implementation of the application further provides a method for triggering sending of CSI. The method may include: a terminal device receives information for requesting sending of the CSI on an unlicensed carrier through a downlink grant for scheduling, by the base station, transmission of a PDSCH. Optionally, the CSI may be transmitted through a PUCCH resource. When a PUCCH on an unlicensed carrier occupies a relatively large quantity of frequency domain resources, the CSI information triggered to be sent by the base station may be transmitted through the PUCCH resource, and accordingly, the trigger signaling (i.e., information for requesting sending of the CSI) may be carried through a downlink grant for scheduling, by the base station, the UE to perform the PDSCH reception. Optionally, the downlink grant includes first indication information, the first indication information is used for determining the target channel access scheme corresponding to the CSI. It should be noted that this solution may be implemented independently.

An implementation of the present disclosure further provides a method for triggering sending of an SR. The method may include: a terminal device receives resource indication information of an SR and/or information for requesting sending of the SR on an unlicensed carrier through a downlink grant for scheduling, by the base station, transmission of a PDSCH or an uplink grant for scheduling, by the base station, transmission of a PUSCH. In an NR-U system on an unlicensed carrier, in addition to configuring periodic SR resources, some aperiodic SR resources need to be additionally indicated to increase SR transmission opportunities of the UE and reduce an uplink transmission delay. Therefore, the SR resources may be indicated by and/or sending of the SR may be triggered by a downlink grant or an uplink grant for scheduling transmission of the UE, thus reducing the number of times of blind PDCCH detection by the UE. Optionally, the downlink grant or the uplink grant includes first indication information, the first indication information is used for determining the target channel access scheme corresponding to the SR resource. It should be noted that this solution may be implemented independently.

FIG. 4 is a second schematic flowchart of a method for determining a channel access scheme according to an implementation of the present disclosure. This example is applied to a base station side. It should be noted that the method for determining a channel access scheme at the base station side may refer to the description of the method for determining a channel access scheme at the terminal device side, and specific examples will not described again. As shown in FIG. 4, the method for determining a channel access scheme includes the following act 401.

In act 401, a base station sends first indication information to a terminal device, wherein the first indication information is used for the terminal device to determine a target channel access scheme corresponding to a target uplink resource, and the target uplink resource is used for transmitting a target uplink channel and/or a target uplink signal.

In an implementation of the present disclosure, the base station may be a network device, such as a 4G base station, a 5G base station, an enhanced 5G base station.

In an implementation of the present disclosure, the terminal device may be any device capable of communicating with a network, such as a mobile phone, a vehicle-mounted terminal, a wearable device, a laptop, a tablet computer.

In an implementation of the present disclosure, the target uplink resource is a resource on an unlicensed carrier.

Optionally, in an implementation of the present disclosure, the target uplink channel and/or the target uplink signal includes at least one of the following: an uplink control channel, an uplink data channel, a random access channel, an SRS, a DMRS, an SR, CSI and HARQ-ACK information. Optionally, the CSI includes at least one of RI, PMI and CQI.

It should be noted that the uplink control channel in an implementation of the present disclosure at least includes a PUCCH, the uplink data channel at least includes a PUSCH, and the random access channel at least includes a PRACH. In addition, the SR, the CSI and the HARQ-ACK may be transmitted through an uplink control channel (such as a PUCCH) or an uplink data channel (such as a PUSCH).

Optionally, the PUSCH includes at least one of a scheduled PUSCH, a CG-PUSCH and a PUSCH only used for transmitting UCI.

In an implementation of the application, the terminal device may receive the first indication information sent by the base station by either one of the following two methods.

Method 1: the base station sends the first indication information to the terminal device through a terminal device-specific RNTI.

Optionally, the terminal device receives a first downlink control channel sent by the base station, wherein the first downlink control channel includes the first indication information, and the first downlink control channel is scrambled by the terminal device-specific RNTI. Or, here, the first indication information is sent to the UE through a UE-specific DCI.

Optionally, when the target uplink signal and/or the target uplink channel is different, the DCI carrying the first indication information may be different.

Method 2: the base station sends the first indication information to the terminal device through a cell-common RNTI, a group-common RNTI, or COT-common scrambling code information.

Optionally, the terminal device receives a first downlink control channel sent by the base station, wherein the first downlink control channel includes the first indication information, and the first downlink control channel is scrambled by the common RNTI. Or, here, the first indication information is sent to the UE through a common DCI.

Optionally, the first indication information is sent to the UE through a cell-common DCI or a group-common DCI.

Optionally, the first indication information in each COT is the same, or the terminal device receives the first indication information through COT-common scrambling code information.

Optionally, different UEs may determine target channel access schemes corresponding to target uplink resources according to the same first indication information.

In method 2, the first indication information is transmitted through the common signaling, so that multiple UEs may determine their respective target channel access schemes after receiving the common signaling, thus no new information bit needs to be added into the UE-specific DCI, and signaling overhead of the UE-specific DCI is saved.

Optionally, the first indication information may also be sent to the UE through SFI information.

In an implementation of the present disclosure, the base station sends a first downlink control channel to the network device, wherein the first downlink control channel includes the first indication information.

Optionally, PDCCH1 is scrambled by at least one of the following RNTIs: Cell RNTI (C-RNTI), Configured Scheduling RNTI (CS-RNTI), Modulation and Coding Scheme C-RNTI (MCS-C-RNTI), Semi-Persistent CSI-RNTI (SP-CSI-RNTI), Temporary C-RNTI (TC-RNTI), Paging RNTI (P-RNTI), System Information RNTI (SI-RNTI), Random Access RNTI (RA-RNTI), Common Control RNTI (CC-RNTI), Group RNTI (G-RNTI), Slot Format Indication RNTI (SFI-RNTI), Interruption RNTI (INT-RNTI), Transmit Power Control-PUSCH-RNTI (TPC-PUSCH-RNTI), Transmit Power Control-PUCCH-RNTI (TPC-PUCCH-RNTI), Transmit Power Control-Sounding Reference Symbols-RNTI (TPC-SRS-RNTI), and Sidelink RNTI (SL-RNTI).

Hereinafter, description will be made with reference to different implementation modes of the target uplink channel, respectively.

Optionally, the target uplink channel includes a first uplink control channel, wherein the first downlink control channel includes information for determining the target uplink resource of the first uplink control channel.

Here, because the target uplink resource may be dynamically indicated through the first downlink control channel, a same first downlink control channel is used for indicating the target channel access schemes corresponding to the target uplink resources at the same time, such that the number of times of blind detections of downlink control channel by the terminal device can be reduced, and that the terminal device needs to receive multiple downlink control channels to determine the transmission of the target uplink signal and/or the target uplink channel can also be avoided.

Optionally, the first downlink control channel further includes information for scheduling transmission of first downlink data channel, and the first uplink control channel is used for transmitting HARQ-ACK information corresponding to the first downlink data channel.

Optionally, if multiple first downlink control channels include indication information of target uplink resources of at least one first uplink control channel which have a same time domain position, and at least two first downlink control channels among the multiple first downlink control channels include the first indication information, then the terminal device determines a target channel access scheme corresponding to the target uplink resources according to at least one of the at least two pieces of first indication information.

Optionally, the terminal device determines the target channel access scheme corresponding to the target uplink resource according to the last first indication information of the at least two pieces of first indication information. Or, the terminal device determines the target channel access scheme corresponding to the target uplink resource according to the penultimate first indication information of the at least two pieces of first indication information.

Optionally, the first uplink control channel is used for transmitting HARQ-ACK information corresponding to a second downlink data channel, wherein the second downlink data channel is scheduled through a second downlink control channel.

Optionally, the target uplink channel and/or the target uplink signal includes at least one of SR and SRS, and the first downlink control channel includes information for requesting sending of the SR and/or the SRS.

Optionally, the first downlink control channel includes information for scheduling transmission of the first downlink data channel, or the first downlink control channel includes information for scheduling transmission of the first uplink data channel.

Optionally, the target uplink channel includes CSI, and the first downlink control channel includes information for requesting sending of the CSI.

Optionally, the target uplink channel includes a first uplink data channel, wherein the first uplink data channel includes CSI, and the first downlink control channel includes information for scheduling transmission of a first uplink data channel.

Optionally, the target uplink channel includes a second uplink control channel, wherein the second uplink control channel includes CSI, and the first downlink control channel includes information for determining a target uplink resource of the second uplink control channel.

Optionally, the CSI is transmitted through a PUCCH, and PDCCH1 for scheduling transmission of the PUCCH includes information for requesting sending of the CSI, the PDCCH1 includes first indication information which is used for determining a target channel access scheme corresponding to the CSI.

Optionally, the CSI is transmitted through a PUSCH, and an downlink grant (i.e., PDCCH1) for scheduling transmission of the PUSCH includes information for requesting sending of the CSI, wherein the downlink grant includes first indication information, and the first indication information is used for determining the target channel access scheme corresponding to the CSI. Optionally, the downlink grant further includes indication information for determining a target PUCCH resource for transmitting the CSI. When a PUCCH on an unlicensed carrier occupies a relatively large quantity of frequency domain resources, the CSI information triggered to be sent by the base station may be transmitted through a PUCCH resource, and accordingly, the trigger signaling may be carried through a downlink grant for scheduling, by the base station, the UE to perform the PUSCH reception.

Optionally, if the target uplink resource is a resource for transmitting aperiodic SR, SRS or CSI, and the target uplink resource is indicated by trigger signaling DCI, the trigger signaling DCI further includes indication information, and the indication information is used for determining the target channel access scheme.

Optionally, when the target uplink channel is a PUSCH, an uplink grant for scheduling transmission of the PUSCH includes the first indication information.

In an implementation of the present disclosure, the first indication information includes at least one of the following information:

whether the target uplink resource is in a COT initiated by the base station;

the target channel access scheme;

a priority of the target channel access scheme;

an end position of a previous transmission opportunity of the transmission opportunity where the target uplink resource is located;

a gap size between a starting position of the transmission opportunity where the target uplink resource is located and the end position of the previous transmission opportunity;

whether transmission of the target uplink signal and/or the target uplink channel includes a placeholder signal;

a starting position of the transmission of the target uplink signal and/or the target uplink channel; and a starting position of the target uplink resource.

An implementation of the application further provides a method for triggering sending of CSI. The method may include: a base station includes information for requesting sending of CSI on an unlicensed carrier in a downlink grant for scheduling transmission of a PDSCH. Optionally, the CSI may be transmitted through a PUCCH resource. When a PUCCH on an unlicensed carrier occupies a relatively large quantity of frequency domain resources, the CSI information triggered to be sent by the base station may be transmitted through the PUCCH resource, and accordingly, the trigger signaling (i.e., the information for requesting sending of the CSI) may be carried through a downlink grant for scheduling, by the base station, the UE to perform the PDSCH reception. Optionally, the downlink grant includes first indication information, the first indication information is used for determining the target channel access scheme corresponding to the CSI. It should be noted that this solution may be implemented independently.

An implementation of the present disclosure further provides a method for triggering sending of an SR. The method may include: a base station includes resource indication information of an SR and/or information for requesting sending of the SR on an unlicensed carrier in a downlink grant for scheduling transmission of a PDSCH or in an uplink grant for scheduling transmission of a PUSCH. In an NR-U system on an unlicensed carrier, in addition to configuring periodic SR resources, some aperiodic SR resources need to be additionally indicated to increase SR transmission opportunities of the UE and reduce an uplink transmission delay. Therefore, the SR resources may be indicated and/or sending of the SR may be triggered by a downlink grant or an uplink grant for scheduling transmission of the UE, thus reducing the number of times of blind PDCCH detection by the UE. Optionally, the downlink grant or the uplink grant includes first indication information, the first indication information is used for determining the target channel access scheme corresponding to the SR resource. It should be noted that this solution may be implemented independently.

The technical solution of the implementations of the present disclosure will be illustrated below with reference to specific application examples.

Application Example 1

On an unlicensed carrier, when scheduling UE to receive a PDSCH, a base station indicates a PUCCH resource for transmitting HARQ-ACK information corresponding to the PDSCH in a downlink grant and indicates a channel access scheme corresponding to the PUCCH resource in the downlink grant. For example, the base station transmits a PDSCH in a time unit n, and a DCI for scheduling the PDSCH includes HARQ-timing indication information (e.g., a PDSCH-to-HARQ-timing-indicator information field in the PDCCH), wherein the HARQ-timing indication information indicates that a time domain position of the PUCCH resource is a time unit n+6. The DCI also includes indication information of the channel access scheme such as Cat-2 LBT. After receiving the DCI, the UE will perform a Cat-2 LBT before a start of the PUCCH resource on the time unit n+6, and perform PUCCH transmission after the LBT succeeds.

If multiple downlink grants indicate PUCCH resources which have a same time domain position, and at least two downlink grants among the multiple downlink grants respectively include the first indication information, then the UE determines a target channel access scheme according to at least one of the at least two pieces of first indication information.

As shown in FIG. 5, on an unlicensed carrier, the base station transmits five PDSCHs to the UE in a COT initiated by the base station, wherein the five PDSCHs are located on time units n, n+1, n+3, n+4 and n+5 respectively, and HARQ-timing indication information carried in the five PDCCHs for scheduling the five PDSCHs is 6, 5, 3, 2 and 1 respectively. The UE may determine that a target PUCCH resource is on the time unit n+6 according to the HARQ-timing indication information, wherein the target PUCCH resource is a PUCCH resource used for transmitting HARQ-ACK information corresponding to the five PDSCHs.

Indication information of channel access schemes carried in the five PDCCHs are Cat-2 LBT, Cat-2 LBT, Cat-1 LBT, Cat-1 LBT and Cat-1 LBT respectively. After receiving the five PDCCHs, the UE determines that the target channel access scheme is Cat-1 LBT according to indication information of channel access scheme carried in the last PDCCH among the five PDCCHs (i.e., a PDCCH on the time unit n+5 or a PDCCH corresponding to a PDSCH on the time unit n+5), so the UE can perform PUCCH transmission on the PUCCH resource on the time unit n+6. Or, after receiving the five PDCCHs, the UE determines that the target channel access scheme is Cat-1 LBT according to indication information of the channel access scheme carried in the penultimate PDCCH among the five PDCCHs (i.e., a PDCCH on the time unit n+4 or a PDCCH corresponding to a PDSCH on the time unit n+4), so the UE can perform PUCCH transmission on the PUCCH resource on the time unit n+6.

Application Example 2

On an unlicensed spectrum, due to an introduction of a new state, HARQ-timing indication information in a PDCCH includes two cases: the first one is used for indicating a time domain position of a PUCCH resource corresponding to a PDSCH scheduled by the PDCCH and used for HARQ-ACK feedback, and the second one is used for indicating that the HARQ-ACK information corresponding to the PDSCH scheduled by the PDCCH will not be fed back temporarily. That is to say, for the second case, other indication information, such as trigger signaling DCI, is needed for determining a PUCCH resource of the HARQ-ACK information corresponding to the PDSCH. The trigger signaling DCI may be UE-specific DCI (such as DCI for scheduling another PDSCH transmission of the UE) or common DCI, which is not limited in the present disclosure. The trigger signaling DCI includes first indication information, the first indication information is used for determining a target channel access scheme.

Figure 6:
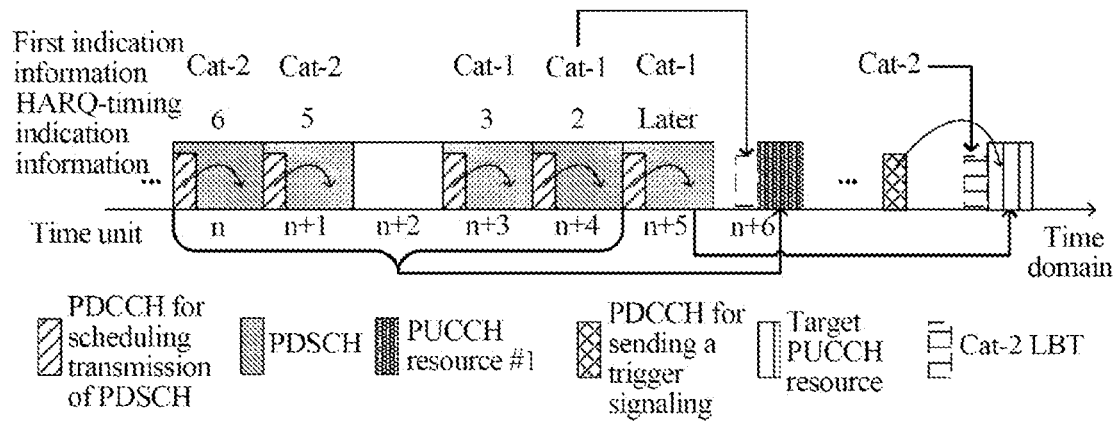
FIG. 6 is a schematic diagram of an application example 2 according to an implementation of the present disclosure.

As shown in FIG. 6, on an unlicensed carrier, the base station transmits five PDSCHs to the UE, wherein the five PDSCHs are located on the time units n, n+1, n+3, n+4 and n+5, respectively. For the PDSCH located on the time unit n+5, the HARQ-timing indication information carried in its corresponding PDCCH means that no feedback is performed temporarily (illustrated by "Later" in the figure for distinguishing). In a time unit after the time unit n+5, the UE receives the trigger signaling DCI, wherein the trigger signaling DCI includes indication information of the target PUCCH resource and the first indication information. The target PUCCH resource is used for transmitting HARQ-ACK information corresponding to the PDSCH on the time unit n+5, and the first indication information is used for determining a channel access scheme corresponding to the target PUCCH resource, which is Cat-2 LBT in the figure. After receiving the trigger signaling DCI, the UE determines that the target channel access scheme is Cat-2 LBT according to the indication information of the channel access scheme carried in the trigger signaling DCI, so the UE will perform Cat-2 LBT before the target PUCCH resource starts and perform PUCCH transmission after the LBT succeeds.

Application Example 3

Figure 7:
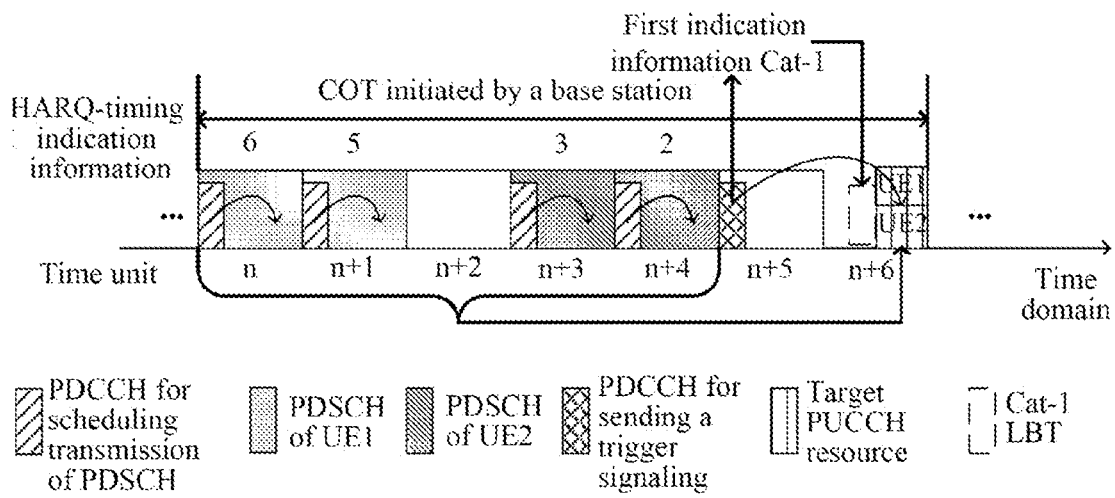
FIG. 7 is a schematic diagram of an application example 3 according to an implementation of the present disclosure.

As shown in FIG. 7, on an unlicensed carrier, the base station respectively transmits two PDSCHs to each of UE1 and UE2 in a COT initiated by the base station. The two PDSCHs of UE1 are located on the time unit n and the time unit n+1 respectively, and HARQ-timing indication information carried in two PDCCHs for scheduling the two PDSCHs is 6 and 5 respectively. According to the HARQ-timing indication information, UE1 may determine that a target PUCCH resource of UE1 is on the time unit n+6, and the target PUCCH resource of UE1 is a PUCCH resource for transmitting HARQ-ACK information corresponding to the two PDSCHs. The two PDSCHs of UE2 are located on the time units n+3 and n+4 respectively, and HARQ-timing indication information carried in the two PDCCHs for scheduling the two PDSCHs is 3 and 2, respectively. According to the HARQ-timing indication information, UE2 mat determine that a target PUCCH resource of UE2 is also on the time unit n+6, and the target PUCCH resource of UE2 is a PUCCH resource for transmitting HARQ-ACK information corresponding to the two PDSCHs. The target PUCCH resource of UE1 and the target PUCCH resource of UE2 may be distinguished by frequency division or code division.

The base station transmits a common DCI on the time unit n+5, wherein the common DCI includes first indication information and the first indication information is used for determining a channel access scheme corresponding to a PUCCH resource on the time unit n+6. For example, the first indication information in FIG. 7 indicates that the channel access scheme is Cat-1 LBT, and after receiving the first indication information, UE1 and UE2 perform PUCCH transmission through their respective target PUCCH resources on the time unit n+6.

Application Example 4

When a target uplink resource is in a COT of a base station, the channel access scheme includes Cat-1 LBT and Cat-2 LBT. When the target uplink resource is not in the COT of the base station, the channel access scheme includes Cat-2 LBT and Cat-4 LBT, wherein Cat-2 LBT can only appear in a specific case, and Cat-4 LBT includes multiple channel access priorities. According to the above features, information bits included in the first indication information can be designed.

For example, the first indication information includes 3 bits, wherein 1 bit is used for indicating whether the target uplink resource is in the COT of the base station. When the target uplink resource is not in the COT of the base station, the channel access scheme is Cat-4, and the remaining 2 bits included in the first indication information are used for indicating a channel access priority under Cat-4 LBT. When the target uplink resource is in the COT of the base station, one of the remaining 2 bits included in the first indication information is used for indicating whether the current channel access mode is Cat-1 LBT or Cat-2 LBT, and the other one of the remaining 2 bits included in the first indication information may be reserved, or may be used for indicating whether transmission of the target uplink signal and/or the target uplink channel includes a placeholder signal.

For another example, the first indication information includes 3 bits, in which 1 bit is used for indicating whether the target channel access scheme is Cat-4 LBT or not. When the target channel access scheme is Cat-4, the remaining 2 bits included in the first indication information are used for indicating the channel access priority under Cat-4 LBT. When the target channel access scheme is not Cat-4, one of the remaining 2 bits included in the first indication information is used for indicating whether the current channel access mode is Cat-1 LBT or Cat-2 LBT, and the other one of the remaining 2 bits included in the first indication information may be reserved, or may be used for indicating whether transmission of the target uplink signal and/or the target uplink channel includes a placeholder signal.

Figure 8:
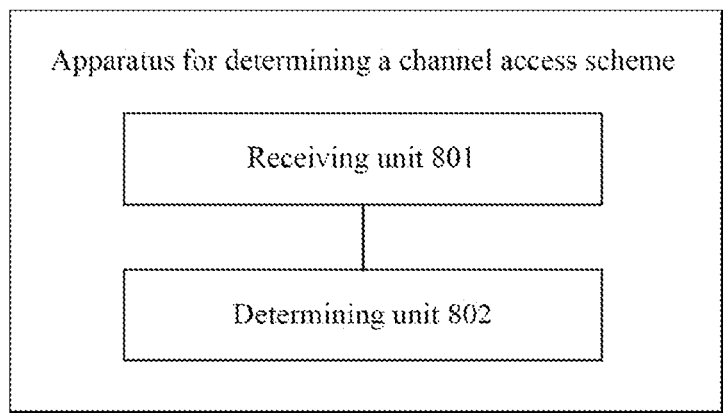
FIG. 8 is a first schematic diagram of a structure of an apparatus for determining a channel access scheme according to an implementation of the present disclosure.

FIG. 8 is a first schematic diagram of a structure of an apparatus for determining a channel access scheme according to an implementation of the present disclosure. As shown in FIG. 8, the apparatus includes a receiving unit 801 and a determining unit 802.

The receiving unit 801 is configured to receive first indication information sent by a base station.

The determining unit 802 is configured to determine a target channel access scheme corresponding to a target uplink resource based on the first indication information, wherein the target uplink resource is used for transmitting a target uplink channel and/or a target uplink signal.

In an implementation of the present disclosure, the target uplink channel and/or the target uplink signal includes at least one of the following: an uplink control channel, an uplink data channel, a random access channel, an SRS, a DMRS, an SR, CSI and HARQ-ACK information.

In an implementation of the present disclosure, the receiving unit 801 is configured to receive a first downlink control channel sent by the base station, and the first downlink control channel includes the first indication information.

In an implementation of the present disclosure, the target uplink channel includes a first uplink control channel, wherein the first downlink control channel includes information for determining a target uplink resource of the first uplink control channel.

In an implementation of the present disclosure, the first downlink control channel further includes information for scheduling transmission of first downlink data channel, and the first uplink control channel is used for transmitting HARQ-ACK information corresponding to the first downlink data channel.

In an implementation of the present disclosure, the determining unit 802 is configured to determine the target channel access scheme corresponding to the target uplink resource according to at least one of the at least two pieces of first indication information if multiple first downlink control channels include indication information of target uplink resources of at least one first uplink control channel which have a same time domain position, and at least two first downlink control channels among the multiple first downlink control channels include the first indication information.

In an implementation of the present disclosure, the determining unit 802 is configured to: determine the target channel access scheme corresponding to the target uplink resource according to the last first indication information of the at least two pieces of first indication information; or, determine the target channel access scheme corresponding to the target uplink resource according to the penultimate first indication information of the at least two pieces of first indication information.

In an implementation of the present disclosure, the first uplink control channel is used for transmitting HARQ-ACK information corresponding to a second downlink data channel, wherein the second downlink data channel is scheduled through a second downlink control channel.

In an implementation of the present disclosure, the target uplink channel and/or the target uplink signal includes at least one of an SR and an SRS, and the first downlink control channel includes information for requesting sending of the SR and/or the SRS.

In an implementation of the present disclosure, the first downlink control channel includes information for scheduling transmission of the first downlink data channel, or the first downlink control channel includes information for scheduling transmission of a first uplink data channel.

In an implementation of the present disclosure, the target uplink channel includes CSI, and the first downlink control channel includes information for requesting sending of the CSI.

In an implementation of the present disclosure, the target uplink channel includes a first uplink data channel, wherein the first uplink data channel includes CSI, and the first downlink control channel includes information for scheduling transmission of the first uplink data channel.

In an implementation of the present disclosure, the target uplink channel includes a second uplink control channel, wherein the second uplink control channel includes CSI, and the first downlink control channel includes information for determining a target uplink resource of the second uplink control channel.

In an implementation of the present disclosure, the receiving unit 801 is configured to receive the first indication information sent by the base station through a terminal device-specific RNTI.

In an implementation of the present disclosure, the receiving unit 801 is configured to receive the first indication information sent by the base station through a cell-common RNTI, a group-common RNTI, or COT-common scrambling code information.

In an implementation of the present disclosure, the determining unit 802 is further configured to determine the target channel access scheme corresponding to the target uplink resource based on a first rule; and re-determine the target channel access scheme corresponding to the target uplink resource according to the first indication information if the first indication information sent by the base station is received before the target channel access scheme is executed.

In an implementation of the present disclosure, the first indication information includes at least one of the following information:

whether the target uplink resource is in a COT initiated by the base station;

the target channel access scheme;

a priority of the target channel access scheme;

an end position of a previous transmission opportunity of the transmission opportunity where the target uplink resource is located;

a gap size between a starting position of the transmission opportunity where the target uplink resource is located and the end position of the previous transmission opportunity;

whether transmission of the target uplink signal and/or the target uplink channel includes a placeholder signal;

a starting position of the transmission of the target uplink signal and/or the target uplink channel; and a starting position of the target uplink resource.

In an implementation of the present disclosure, the target uplink resource is a resource on an unlicensed carrier.

Those skilled in the art should understand that the relevant description of the apparatus for determining a channel access scheme of the implementations of the present disclosure may be understood with reference to the relevant description of the method for determining a channel access scheme of the implementations of the present disclosure.

Figure 9:
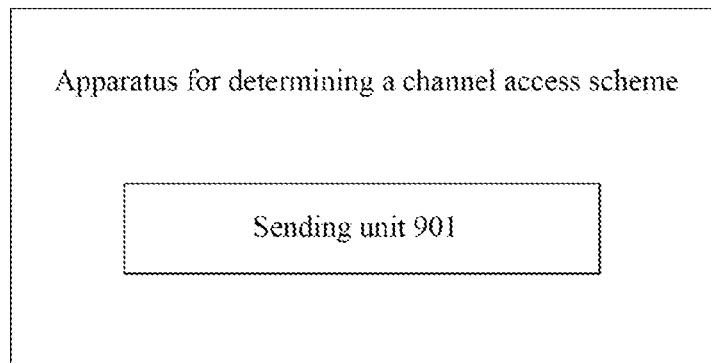
FIG. 9 is a second schematic diagram of a structure of an apparatus for determining a channel access scheme according to an implementation of the present disclosure.

FIG. 9 is a second schematic diagram of a structure of an apparatus for determining a channel access scheme according to an implementation of the present disclosure. As shown in FIG. 9, the apparatus includes a sending unit 901.

The sending unit 901 is configured to send first indication information to a terminal device, wherein the first indication information is used for the terminal device to determine a target channel access scheme corresponding to a target uplink resource, and the target uplink resource is used for transmitting a target uplink channel and/or a target uplink signal.

In an implementation of the present disclosure, the target uplink channel and/or the target uplink signal includes at least one of the following: an uplink control channel, an uplink data channel, a random access channel, an SRS, a DMRS, an SR, CSI and HARQ-ACK information.

In an implementation of the present disclosure, the sending unit 901 is configured to send a first downlink control channel to a network device, wherein the first downlink control channel includes the first indication information.

In an implementation of the present disclosure, the target uplink channel includes a first uplink control channel, wherein the first downlink control channel includes information for determining a target uplink resource of the first uplink control channel.

In an implementation of the present disclosure, the first downlink control channel further includes information for scheduling transmission of first downlink data channel, and the first uplink control channel is used for transmitting HARQ-ACK information corresponding to the first downlink data channel.

In an implementation of the present disclosure, the first uplink control channel is used for transmitting HARQ-ACK information corresponding to a second downlink data channel, wherein the second downlink data channel is scheduled through a second downlink control channel.

In an implementation of the present disclosure, the target uplink channel and/or the target uplink signal includes at least one of an SR and an SRS, and the first downlink control channel includes information for requesting sending of the SR and/or the SRS.

In an implementation of the present disclosure, the first downlink control channel includes information for scheduling transmission of the first downlink data channel, or the first downlink control channel includes information for scheduling transmission of a first uplink data channel.

In an implementation of the present disclosure, the target uplink channel includes CSI, and the first downlink control channel includes information for requesting sending of the CSI.

In an implementation of the present disclosure, the target uplink channel includes a first uplink data channel, wherein the first uplink data channel includes CSI, and the first downlink control channel includes information for scheduling transmission of the first uplink data channel.

In an implementation of the present disclosure, the target uplink channel includes a second uplink control channel, wherein the second uplink control channel includes CSI, and the first downlink control channel includes information for determining a target uplink resource of the second uplink control channel.

In an implementation of the present disclosure, the sending unit 901 is configured to send the first indication information to the terminal device through a terminal device-specific RNTI.

In an implementation of the present disclosure, the sending unit 901 is configured to send the first indication information to the terminal device through a cell-common RNTI, a group-common RNTI, or COT-common scrambling code information.

In an implementation of the present disclosure, the first indication information includes at least one of the following information:

whether the target uplink resource is in a COT initiated by the base station;

the target channel access scheme;

a priority of the target channel access scheme;

an end position of a previous transmission opportunity of the transmission opportunity where the target uplink resource is located;

a gap size between a starting position of the transmission opportunity where the target uplink resource is located and the end position of the previous transmission opportunity;

whether transmission of the target uplink signal and/or the target uplink channel includes a placeholder signal;

a starting position of the transmission of the target uplink signal and/or the target uplink channel; and a starting position of the target uplink resource.

In an implementation of the present disclosure, the target uplink resource is a resource on an unlicensed carrier.

Those skilled in the art should understand that the relevant description of the apparatus for determining a channel access scheme of the implementations of the present disclosure may be understood with reference to the relevant description of the method for determining a channel access scheme of the implementations of the present disclosure.

Figure 10:
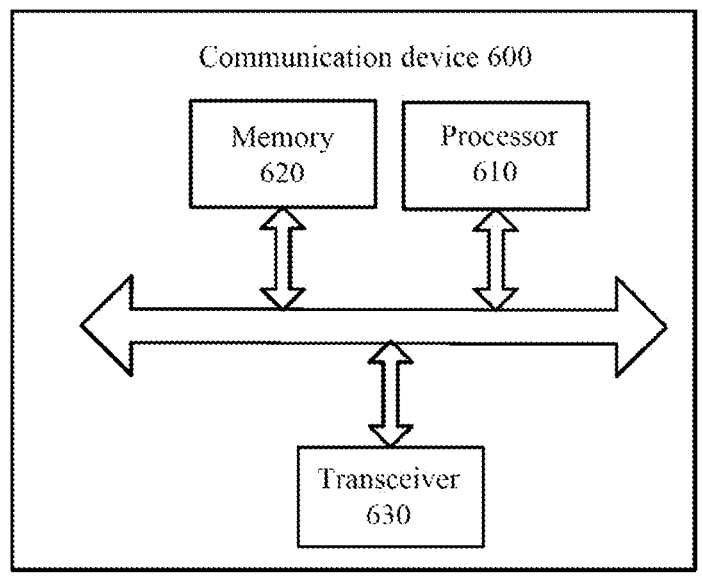
FIG. 10 is a schematic diagram of a structure of a communication device according to an implementation of the present disclosure.

FIG. 10 is a schematic diagram of a structure of a communication device 600 according to an implementation of the present disclosure. The communication device may be a terminal device or a base station. The communication device 600 shown in FIG. 10 includes a processor 610. The processor 610 may call and run a computer program from a memory to implement the method in an implementation of the present disclosure.

Optionally, as shown in FIG. 10, the communication device 600 may further include a memory 620. Herein, the processor 610 may call and run a computer program from the memory 620 to implement the method in the implementation of the present disclosure.

Herein, the memory 620 may be a separate device independent of the processor 610 or may be integrated in the processor 610.

Optionally, as shown in FIG. 10, the communication device 600 may further include a transceiver 630, and the processor 610 may control the transceiver 630 to communicate with another device. Specifically, the transceiver 830 may send information or data to another device or receive information or data sent by another device.

The transceiver 630 may include a transmitter and a receiver. The transceiver 630 may further include antennas, and the number of the antennas may be one or more.

Optionally, the communication device 600 may specifically be a network device according to an implementation of the present disclosure, and the communication device 600 may implement the corresponding processes implemented by the network device in various methods of the implementations of the present disclosure, which will not be repeated here for brevity.

Optionally, the communication device 600 may specifically be a mobile terminal/terminal device of an implementation of the present disclosure, and the communication device 600 may implement the corresponding processes implemented by the mobile terminal/terminal device in various methods of the implementations of the present disclosure, which will not be repeated here for brevity.

Figure 11:
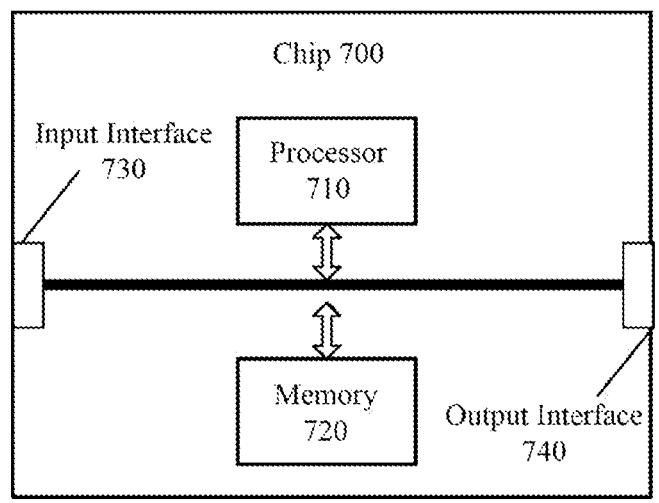
FIG. 11 is a schematic diagram of a structure of a chip according to an implementation of the present disclosure.

FIG. 11 is a schematic diagram of structure of a chip of an implementation of the present disclosure. A chip 700 shown in FIG. 11 includes a processor 710. The processor 710 may call and run a computer program from a memory to implement a method in an implementation of the present disclosure.

Optionally, as shown in FIG. 11, the chip 700 may further include a memory 720. The processor 710 may call and run a computer program from the memory 720 to implement a method in an implementation of the present disclosure.

The memory 720 may be a separate device independent of the processor 710 or may be integrated in the processor 710.

Optionally, the chip 700 may further include an input interface 730. The processor 710 may control the input interface 730 to communicate with another device or chip. Specifically, the processor may acquire information or data sent by another device or chip.

Optionally, the chip 700 may further include an output interface 740. The processor 710 may control the output interface 740 to communicate with another device or chip. Specifically, the processor may output information or data to another device or chip.

Optionally, the chip may be applied to a network device in an implementation of the present disclosure, and the chip may implement the corresponding processes implemented by the network device in various methods of the implementations of the present disclosure, which will not be repeated here for brevity.

Optionally, the chip may be applied to a mobile terminal/terminal device in an implementation of the present disclosure, and the chip may implement the corresponding processes implemented by the mobile terminal/terminal device in various methods of the implementations of the present disclosure, which will not be repeated here for brevity.

It should be understood that the chip mentioned in the implementation of the present disclosure may also be referred to as a system-level chip, a system chip, a chip system or a system chip-on-chip, etc.

Figure 12:
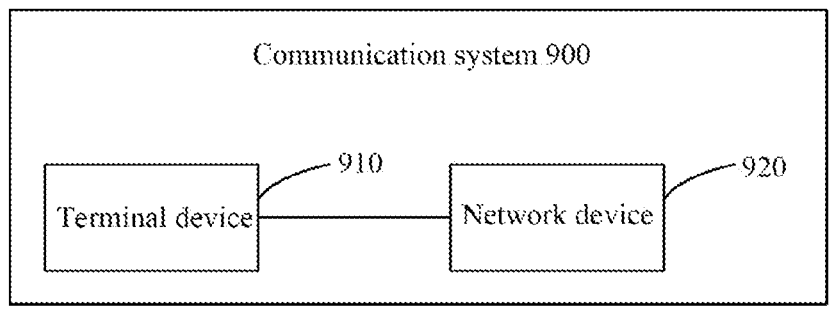
FIG. 12 is a schematic block diagram of a communication system according to an implementation of the present disclosure.

FIG. 12 is a schematic block diagram of a communication system 900 according to an implementation of the present disclosure. As shown in FIG. 12, the communication system 900 includes a terminal device 910 and a network device 920.

The terminal device 910 may be configured to implement the corresponding functions implemented by the terminal device in the above-mentioned method, and the network device 920 may be configured to implement the corresponding functions implemented by the network device in the above-mentioned method, which will not be repeated here for brevity.

It should be understood that, the processor in an implementation of the present disclosure may be an integrated circuit chip having a signal processing capability. In an implementation process, the acts of the foregoing method implementations may be accomplished by an integrated logic circuit of hardware in the processor or instructions in a form of software. The above processor may be a general purpose processor, a Digital Signal Processor (DSP), an Application Specific Integrated Circuit (ASIC), a Field Programmable Gate Array (FPGA) or another programmable logic device, a discrete gate or a transistor logic device, or a discrete hardware component. The methods, acts and logical block diagrams disclosed in the implementation of the present disclosure may be implemented or performed. The general purpose processor may be a microprocessor, or the processor may also be any conventional processor or the like. The acts of the method disclosed with reference to an implementation of the present disclosure may be directly implemented by a hardware decoding processor, or may be implemented by a combination of hardware and software modules in the decoding processor. The software modules may be located in a memory medium commonly used in the art, such as a random access memory, a flash memory, a read-only memory, a programmable read-only memory or an electrically erasable programmable memory, or a register. The storage medium is located in the memory, and the processor reads the information in the memory and completes the acts of the above method in combination with its hardware.

It may be understood that, the memory in an implementation of the present disclosure may be a volatile memory or a non-volatile memory, or may include both a volatile memory and a non-volatile memory. The non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. As an exemplary but not limitative description, many forms of RAMs may be used, for example, a Static RAM (SRAM), a Dynamic RAM (DRAM), a Synchronous DRAM (SDRAM), a Double Data Rate SDRAM (DDRSDRAM), an Enhanced SDRAM (ES- DRAM), a Synchlink DRAM (SLDRAM), and a Direct Rambus RAM (DRRAM). It should be noted that memories in the systems and methods described in this specification are intended to include, but are not limited to, these memories and any memory of another proper type.

It should be understood that, the foregoing memory is exemplary but not limitative description. For example, the memory in the implementations of the present disclosure may also be a Static RAM (SRAM), a Dynamic RAM (DRAM), a Synchronous DRAM (SDRAM), a double data rate SDRAM (DDR SDRAM), an enhanced SDRAM (ESDRAM), or a synchlink DRAM (SLDRAM), a Direct Rambus RAM (DR RAM), or the like. That is, memories in the implementations of the present disclosure are intended to include, but are not limited to, these memories and any memory of another proper type.

An implementation of the present disclosure further provides a computer readable storage medium configured to store a computer program.

Optionally, the computer readable storage medium may be applied to a network device in an implementation of the present disclosure, and the computer program enables a computer to perform the corresponding processes implemented by the network device in various methods of the implementations of the present disclosure, which will not be repeated here for brevity.

Optionally, the computer readable storage medium may be applied to a mobile terminal/terminal device in an implementation of the present disclosure, and the computer program enables a computer to perform the corresponding processes implemented by the mobile terminal/terminal device in various methods of the implementations of the present disclosure, which will not be repeated here for brevity.

An implementation of the present disclosure further provides a computer program product including computer program instructions.

Optionally, the computer program product may be applied to a network device in an implementation of the present disclosure, and the computer program instructions enable a computer to perform the corresponding processes implemented by the network device in various methods of the implementations of the present disclosure, which will not be repeated here for brevity.

Optionally, the computer program product may be applied to a mobile terminal/terminal device in an implementation of the present disclosure, and the computer program instructions enable a computer to perform the corresponding processes implemented by the mobile terminal/terminal device in various methods of the implementations of the present disclosure, which will not be repeated here for brevity.

An implementation of the present disclosure further provides a computer program.

Optionally, the computer program may be applied to a network device in an implementation of the present disclosure. When the computer program is run on a computer, the computer is enabled to perform the corresponding processes implemented by the network device in various methods of the implementations of the present disclosure, which will not be repeated here for brevity.

Optionally, the computer program may be applied to a mobile terminal/terminal device in an implementation of the present disclosure. When the computer program is run on a computer, the computer is enabled to perform the corresponding processes implemented by the mobile terminal/terminal device in various methods of the implementations of the present disclosure, which will not be repeated here for brevity.

Those of ordinary skill in the art will recognize that the example elements and algorithm acts described in combination with implementations disclosed herein may be implemented in electronic hardware, or a combination of computer software and electronic hardware. Whether these functions are implemented in hardware or software depends on the specific application and design constraints of the technical solution. Those skilled in the art may use different methods to implement the described functions in respect to each particular application, but such implementation should not be considered to be beyond the scope of the present disclosure.

Those skilled in the art may clearly learn that for convenience and conciseness of description, the specific working processes of systems, apparatuses and units described above may refer to the corresponding processes in the method implementations, and this will not be repeated here.

In several implementations provided by the present disclosure, it should be understood that the disclosed systems, apparatuses and methods may be implemented in another manner. For example, the apparatus implementations described above are only illustrative, for example, the division of the units is only a logical function division, and there may be another division manner in an actual implementation, for example, multiple units or components may be combined or integrated into another system, or some features may be ignored or not executed. At another point, the mutual coupling or the direct coupling or the communication connection shown or discussed may be indirect coupling or a communication connection between apparatuses or units through some interface, and may be in electrical, mechanical or another form.

A unit described as a separate component may or may not be physically separated, and the component shown as a unit may or may not be a physical unit, i.e., it may be located in one place or may be distributed over multiple network units. Part or all of the units therein may be selected according to an actual need to achieve the purpose of the solution of the present implementation.

In addition, various functional units in various implementations of the present disclosure may be integrated in one processing unit, or the various units may be physically present separately, or two or more units may be integrated in one unit.

The functions may be stored in a computer readable storage medium, if realized in a form of software functional units and sold or used as a separate product. Based on this understanding, the technical solution of the present disclosure, in essence, or the part contributing to the prior art, or the part of the technical solution, may be embodied in the form of a software product, wherein the computer software product is stored in a storage medium and includes a number of instructions for causing a computer device (which may be a personal computer, a server, or a network device, or the like) to perform all or part of the acts of the method described in various implementations of the present disclosure. The aforementioned storage medium includes various media, such as a U disk, a mobile hard disk, a read-only memory (ROM), a random access memory (RAM), a magnetic disk, or an optical disk, which are capable of storing program codes.

What are described above are merely exemplary implementations of the present disclosure, but the protection scope of the present disclosure is not limited thereto. Any variation or substitution that may be easily conceived by a person skilled in the art within the technical scope disclosed by the present disclosure shall be included within the protection scope of the present disclosure. Therefore, the protection scope of the present disclosure shall be subject to the protection scope of the claims.

What is claimed is:

1. A method for determining a channel access scheme, comprising:
   receiving, by a terminal device, a first downlink control channel sent by a base station, wherein the first downlink control channel comprises first indication information, wherein the first indication information is used for the terminal device to determine a target channel access scheme corresponding to a target uplink resource, and wherein the target uplink resource is used for transmitting a target uplink channel;
   wherein the target uplink channel comprises a first uplink control channel, and the first downlink control channel comprises information for determining a target uplink resource of the first uplink control channel; and
   determining, by the terminal device, the target channel access scheme corresponding to the target uplink resource according to at least one of at least two pieces of the first indication information, when a plurality of first downlink control channels comprise indication information of target uplink resources of a plurality of first uplink control channels with a same time unit, wherein each of the plurality of first downlink control channels comprises indication information of a target uplink resource, and at least two first downlink control channels of the plurality of first downlink control channels comprise the first indication information;
   wherein the first indication information is further used for determining a first starting position of the transmission of the target uplink channel; when the first starting position and a second starting position of the target uplink resource are different, if the first starting position is later than the second starting position, a placeholder signal is transmitted between the first starting position and the second starting position, wherein the placeholder signal is an extension part of cyclic prefix of a first symbol transmitted on the target uplink resource.

2. The method of claim 1, wherein the first downlink control channel further comprises information for scheduling transmission of a first downlink data channel, and the first uplink control channel is used for transmitting HARQ-ACK information corresponding to the first downlink data channel.

3. The method of claim 1, wherein determining, by the terminal device, the target channel access scheme corresponding to the target uplink resource according to the at least one of the at least two pieces of first indication information comprises:
   determining, by the terminal device, the target channel access scheme corresponding to the target uplink resource according to last first indication information of the at least two pieces of first indication information.

4. The method of claim 3, wherein when the target uplink channel is a Physical Uplink Control Channel (PUCCH) and the target uplink resource is a PUCCH resource, a Physical Downlink Control Channel (PDCCH) for determining the PUCCH resource comprises the first indication information.

5. The method of claim 1, further comprising:
   determining, by the terminal device, the target channel access scheme corresponding to the target uplink resource based on a first rule;
   re-determining, by the terminal device, the target channel access scheme corresponding to the target uplink resource according to the first indication information when the terminal device receives the first indication information sent by the base station before executing the target channel access scheme.

6. The method of claim 1, wherein the first indication information comprises:
   the target channel access scheme; and a starting position of the target uplink resource.

7. A method for determining a channel access scheme, comprising:
   sending, by a base station, a first downlink control channel to a terminal device, wherein the first downlink control channel comprises first indication information, wherein the first indication information is used for the terminal device to determine a target channel access scheme corresponding to a target uplink resource, and the target uplink resource is used for transmitting a target uplink channel;
   wherein the first indication information comprises the target channel access scheme and a starting position of the target uplink resource;
   wherein the target uplink channel comprises a first uplink control channel, and the first downlink control channel comprises information for determining a target uplink resource of the first uplink control channel;
   wherein the first indication information is further used for determining a first starting position of the transmission of the target uplink channel; when the first starting position and a second starting position of the target uplink resource are different, if the first starting position is later than the second starting position, a placeholder signal is transmitted between the first starting position and the second starting position, wherein the placeholder signal is an extension part of cyclic prefix of a first symbol transmitted on the target uplink resource.

8. The method of claim 7, wherein the first downlink control channel further comprises information for scheduling transmission of a first downlink data channel, and the first uplink control channel is used for transmitting HARQ-ACK information corresponding to the first downlink data channel.

9. The method of claim 7, wherein when the target uplink channel is a Physical Uplink Control Channel (PUCCH) and the target uplink resource is a PUCCH resource, a Physical Downlink Control Channel (PDCCH) for determining the PUCCH resource comprises the first indication information.

10. An apparatus for determining a channel access scheme, comprising: a processor and a transceiver, wherein
    the transceiver is configured to receive a first downlink control channel sent by a base station, wherein the first downlink control channel comprises first indication information; and
    the processor is configured to
    determine a target channel access scheme corresponding to a target uplink resource based on at least one of at least two pieces of the first indication information in the first downlink control channel, when a plurality of first downlink control channels comprise indication information of target uplink resources of a plurality of first uplink control channels with a same time unit; wherein each of the plurality of first downlink control channels comprises indication information of a target uplink resource, and at least two first downlink control channels of the plurality of first downlink control channels comprise the first indication information;

wherein the target uplink resource is used for transmitting a target uplink channel;

wherein the target uplink channel comprises a first uplink control channel, and the first downlink control channel comprises information for determining a target uplink resource of the first uplink control channel;

wherein the first indication information is further used for determining a first starting position of the transmission of the target uplink channel; when the first starting position and a second starting position of the target uplink resource are different, if the first starting position is later than the second starting position, a placeholder signal is transmitted between the first starting position and the second starting position, wherein the placeholder signal is an extension part of cyclic prefix of a first symbol transmitted on the target uplink resource.

11. The apparatus of claim 10, wherein the first downlink control channel further comprises information for scheduling transmission of a first downlink data channel, and the first uplink control channel is used for transmitting HARQ-ACK information corresponding to the first downlink data channel.

12. The apparatus of claim 10, wherein the processor is configured to:

determine the target channel access scheme corresponding to the target uplink resource according to last first indication information of the at least two pieces of first indication information.

13. The apparatus of claim 12, wherein when the target uplink channel is a Physical Uplink Control Channel (PUCCH) and the target uplink resource is a PUCCH resource, a Physical Downlink Control Channel (PDCCH) for determining the PUCCH resource comprises the first indication information.

14. The apparatus of claim 10, wherein the processor is further configured to determine the target channel access scheme corresponding to the target uplink resource based on a first rule; and re-determine the target channel access scheme corresponding to the target uplink resource according to the first indication information when the first indication information sent by the base station is received before the target channel access scheme is executed.

15. The apparatus of claim 10, wherein the first indication information comprises:

the target channel access scheme; and a starting position of the target uplink resource.

16. An apparatus for determining a channel access scheme, comprising: a processor and a transceiver, wherein the transceiver is configured to send a first downlink control channel to a terminal device, wherein the first downlink control channel comprises first indication information, wherein the first indication information is used for the terminal device to determine a target channel access scheme corresponding to a target uplink resource, and the target uplink resource is used for transmitting a target uplink channel;

wherein the first indication information comprises the target channel access scheme and a starting position of the target uplink resource;

wherein the target uplink channel comprises a first uplink control channel, and the first downlink control channel comprises information for determining a target uplink resource of the first uplink control channel;

wherein the first indication information is further used for determining a first starting position of the transmission of the target uplink channel; when the first starting position and a second starting position of the target uplink resource are different, if the first starting position is later than the second starting position, a placeholder signal is transmitted between the first starting position and the second starting position, wherein the placeholder signal is an extension part of cyclic prefix of a first symbol transmitted on the target uplink resource.

17. The apparatus of claim 16, wherein the first downlink control channel further comprises information for scheduling transmission of a first downlink data channel, and the first uplink control channel is used for transmitting HARQ-ACK information corresponding to the first downlink data channel.

18. The apparatus of claim 16, wherein when the target uplink channel is a Physical Uplink Control Channel (PUCCH) and the target uplink resource is a PUCCH resource, a Physical Downlink Control Channel (PDCCH) for determining the PUCCH resource comprises the first indication information.

\* \* \* \* \*